(12) United States Patent
Nakamura et al.

(10) Patent No.: US 11,829,058 B2
(45) Date of Patent: Nov. 28, 2023

(54) LIGHT SOURCE DEVICE AND IMAGE PROJECTION APPARATUS INCLUDING A ROD INTEGRATOR AND LIGHT GUIDE

(71) Applicants: Kasumi Nakamura, Kanagawa (JP); Yohei Takano, Kanagawa (JP); Tatsuya Takahashi, Kanagawa (JP); Makoto Hirakawa, Tokyo (JP)

(72) Inventors: Kasumi Nakamura, Kanagawa (JP); Yohei Takano, Kanagawa (JP); Tatsuya Takahashi, Kanagawa (JP); Makoto Hirakawa, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/823,340

(22) Filed: Mar. 19, 2020

(65) Prior Publication Data

US 2020/0301266 A1 Sep. 24, 2020

(30) Foreign Application Priority Data

Mar. 20, 2019 (JP) .................................. 2019-052670
Dec. 2, 2019 (JP) .................................. 2019-217929

(51) Int. Cl.
*G03B 21/20* (2006.01)
*H04N 9/31* (2006.01)

(52) U.S. Cl.
CPC ........ *G03B 21/204* (2013.01); *G03B 21/2033* (2013.01); *G03B 21/2066* (2013.01); *H04N 9/3152* (2013.01)

(58) Field of Classification Search
CPC .................................................. G03B 21/204
See application file for complete search history.

(56) References Cited

U.S. PATENT DOCUMENTS 8,789,957 B2 * 7/2014 Yang .................... G03B 21/204
362/84
9,046,750 B2 * 6/2015 Matsubara ........... G03B 21/208
(Continued)

FOREIGN PATENT DOCUMENTS

CN 104820334 A 8/2015
CN 107111221 A 8/2017
(Continued)

OTHER PUBLICATIONS

Handbook of Optics, vol. III, 2nd Edition (Year: 2001).*
(Continued)

*Primary Examiner* — Bao-Luan Q Le
(74) *Attorney, Agent, or Firm* — XSENSUS LLP

(57) ABSTRACT

A light-source device includes an excitation light source; an optical element having a reflecting surface to reflect first colored light emitted from the excitation light source; and a wavelength conversion unit including a waveform conversion member configured to convert at least a portion of the first colored light reflected by the optical element and incident on the wavelength conversion unit, into second colored light having a wavelength different from a wavelength of the first colored light and emit the second colored light. A point P does not intersect with a light flux Q where the point P is a center of the first colored light on the reflecting surface of the optical element and the light flux Q is a light flux of the first colored light emitted from the wavelength conversion unit.

13 Claims, 22 Drawing Sheets

(56) References Cited

U.S. PATENT DOCUMENTS

| | | | |
|---|---|---|---|
| 9,435,996 B2* | 9/2016 | Kim | G03B 21/2066 |
| 9,568,816 B2* | 2/2017 | Ferri | G03B 21/204 |
| 9,677,720 B2* | 6/2017 | Hadrath | F21V 13/12 |
| 9,798,134 B2* | 10/2017 | Bhakta | G02B 5/1861 |
| 9,903,564 B2* | 2/2018 | Pijlman | F21S 41/675 |
| 9,982,861 B2* | 5/2018 | Park | F21V 5/04 |
| 9,983,471 B1* | 5/2018 | Lin | H04N 9/3161 |
| 10,203,591 B2* | 2/2019 | Hu | G02B 26/008 |
| 10,267,468 B2* | 4/2019 | Park | F21V 29/713 |
| 10,368,043 B2* | 7/2019 | Chiu | G03B 21/142 |
| 10,459,323 B2* | 10/2019 | Liao | G03B 21/204 |
| 2012/0019791 A1 | 1/2012 | Abe et al. | |
| 2012/0092628 A1 | 4/2012 | Takahashi et al. | |
| 2012/0147332 A1* | 6/2012 | Huang | G03B 21/2013 353/31 |
| 2012/0206900 A1* | 8/2012 | Yang | G03B 21/204 362/84 |
| 2012/0236266 A1 | 9/2012 | Takahashi et al. | |
| 2013/0010264 A1 | 1/2013 | Takahashi et al. | |
| 2013/0021582 A1 | 1/2013 | Fujita et al. | |
| 2013/0215397 A1* | 8/2013 | Matsubara | G03B 21/2066 353/57 |
| 2013/0222772 A1* | 8/2013 | Matsubara | G03B 21/208 353/31 |
| 2013/0235356 A1 | 9/2013 | Takahashi et al. | |
| 2013/0308104 A1 | 11/2013 | Nishimori et al. | |
| 2013/0322056 A1 | 12/2013 | Konuma et al. | |
| 2014/0022512 A1* | 1/2014 | Li | G03B 21/14 353/31 |
| 2014/0028983 A1 | 1/2014 | Fujita et al. | |
| 2014/0036241 A1 | 2/2014 | Takehiro et al. | |
| 2014/0049755 A1 | 2/2014 | Nishimori et al. | |
| 2014/0071182 A1 | 3/2014 | Takahashi et al. | |
| 2014/0071407 A1 | 3/2014 | Takahashi et al. | |
| 2014/0071408 A1 | 3/2014 | Takahashi et al. | |
| 2014/0139810 A1* | 5/2014 | Matsubara | G03B 21/2013 353/31 |
| 2014/0160441 A1* | 6/2014 | Kim | G02B 26/008 353/33 |
| 2014/0240679 A1 | 8/2014 | Nishimori et al. | |
| 2014/0240680 A1 | 8/2014 | Nishimori et al. | |
| 2014/0268068 A1 | 9/2014 | Takahashi et al. | |
| 2014/0268069 A1 | 9/2014 | Takahashi et al. | |
| 2014/0268072 A1 | 9/2014 | Takahashi et al. | |
| 2014/0268073 A1 | 9/2014 | Takano | |
| 2014/0340649 A1 | 11/2014 | Takahashi et al. | |
| 2014/0340658 A1 | 11/2014 | Takano et al. | |
| 2014/0375958 A1* | 12/2014 | Kuwata | G02B 27/0994 353/30 |
| 2015/0042963 A1 | 2/2015 | Nishimori et al. | |
| 2015/0131062 A1 | 5/2015 | Nishimori et al. | |
| 2015/0146174 A1* | 5/2015 | Ferri | G02B 26/008 353/31 |
| 2015/0253653 A1 | 9/2015 | Fujita et al. | |
| 2015/0267880 A1* | 9/2015 | Hadrath | G03B 21/204 362/84 |
| 2015/0316840 A1 | 11/2015 | Maeda et al. | |
| 2015/0370048 A1 | 12/2015 | Takano | |
| 2016/0004147 A1* | 1/2016 | Hu | G02B 26/008 362/84 |
| 2016/0091700 A1 | 3/2016 | Takano | |
| 2016/0103304 A1 | 4/2016 | Takano et al. | |
| 2016/0103387 A1 | 4/2016 | Nishimori et al. | |
| 2016/0109221 A1 | 4/2016 | Takahashi et al. | |
| 2016/0187644 A1* | 6/2016 | Bhakta | G02B 5/1861 359/292 |
| 2016/0223892 A1 | 8/2016 | Takahashi et al. | |
| 2016/0320692 A1 | 11/2016 | Takahashi et al. | |
| 2016/0327245 A1* | 11/2016 | Pijlman | F21S 41/675 |
| 2016/0349606 A1 | 12/2016 | Nishimori et al. | |
| 2016/0377969 A1 | 12/2016 | Nishimori et al. | |
| 2017/0059836 A1 | 3/2017 | Takano | |
| 2017/0059971 A1 | 3/2017 | Takano et al. | |
| 2017/0064268 A1 | 3/2017 | Shibayama et al. | |
| 2017/0299953 A1 | 10/2017 | Maeda et al. | |
| 2017/0328540 A1 | 11/2017 | Paul et al. | |
| 2018/0003934 A1 | 1/2018 | Takano et al. | |
| 2018/0074302 A1 | 3/2018 | Takano et al. | |
| 2018/0272538 A1 | 9/2018 | Takahashi et al. | |
| 2018/0299757 A1* | 10/2018 | Liao | G03B 21/204 |
| 2019/0110030 A1* | 4/2019 | Chiu | G02B 27/1006 |
| 2019/0129288 A1 | 5/2019 | Maeda et al. | |
| 2019/0170988 A1 | 6/2019 | Takano et al. | |
| 2019/0219801 A1 | 7/2019 | Takano et al. | |
| 2020/0064719 A1 | 2/2020 | Nakamura et al. | |

FOREIGN PATENT DOCUMENTS

| | | |
|---|---|---|
| CN | 108572498 A | 9/2018 |
| JP | 2010-197497 A | 9/2010 |
| JP | 2011-013320 | 1/2011 |
| JP | 2012-123179 | 6/2012 |
| JP | 2013-065414 | 4/2013 |
| JP | 2015-040892 A | 3/2015 |
| WO | 2013/046483 A1 | 4/2013 |
| WO | 2013/114665 A1 | 8/2013 |
| WO | 2018/166038 A1 | 9/2018 |

OTHER PUBLICATIONS

Extended European Search Report dated Sep. 15, 2020, issued in corresponding European Patent Application No. 20163730.3, 7 pages.
Office Action dated Jun. 1, 2021 in Chinese Patent Application No. 202010168343.4, 7 pages.
Office Action dated Apr. 28, 2022 in Chinese Patent Application No. 202010168343.4, 7 pages.
Applied Optics (5th Edition), Beijing Institute of Technology Press, Jan. 31, 2017, 17 pages. (with Partial English Translation).
Office Action dated Aug. 1, 2023 in Japanese Patent Application No. 2019-217929, 17 pages.

* cited by examiner

TOTAL OPTICAL ENERGY CONTAINED IN ▢ : A

TOTAL OPTICAL ENERGY CONTAINED IN ▭ : B

LIGHT SOURCE DEVICE AND IMAGE PROJECTION APPARATUS INCLUDING A ROD INTEGRATOR AND LIGHT GUIDE

CROSS-REFERENCE TO RELATED APPLICATIONS

This patent application is based on and claims priority pursuant to 35 U.S.C. § 119(a) to Japanese Patent Application No. 2019-052670, filed on Mar. 20, 2019 and Japanese Patent Application No. 2019-217929, filed on Dec. 2, 2019 in the Japan Patent Office, the entire disclosure of which is hereby incorporated by reference herein.

BACKGROUND

Technical Field

The present disclosure relates to a light source device, an image projection apparatus, and a light source optical system.

Related Art

Projectors (image projection apparatuses) that magnify and project various images are widely used. A projector focuses light emitted by a light source onto a spatial light modulation element, such as a digital micromirror device (DMD) or a liquid crystal display element, and displays, as a color image, light modulated in accordance with an image signal and emitted from the spatial light modulation element onto a screen.

A projector in many cases uses, for example, a high-brightness extra-high-pressure mercury lamp in related art. However, the life of such a lamp is short and the maintenance is frequently required. Owing to this, the number of projectors provided with, for example, laser sources or light emitting diodes (LEDs) instead of extra-high-pressure mercury lamps is growing. This is because a laser source and an LED have longer lives and higher color reproducibility due to monochromaticity compared to an extra-high-pressure mercury lamp.

A projector irradiates an image display element such as a DMD with light of, for example, three colors including red, green, and blue which are primary colors to form an image. All the three colors can be generated by laser sources; however, this is not desirable because a green laser and a red laser have lower emission efficiencies than a blue laser. Thus, there is used a method of irradiating a fluorescent material with a blue laser beam as excitation light to obtain fluorescence (fluorescence light) through wavelength conversion at the fluorescent material and generating red light and green light from the fluorescence.

Since excitation light of several tens of watts (W) is condensed and emitted to the fluorescent material, the efficiency degradation or the changes over time might occur due to burnout or temperature rise. For this reason, the phosphor (fluorescent material) layer is formed on the disk and rotated to prevent the irradiation position of the excitation light from being concentrated on one point. The disk is called a phosphor wheel. In the phosphor wheel, the fluorescent material is formed in a fan shape or a toroidal shape along the periphery of the disk.

SUMMARY

In one aspect of this disclosure, there is provided an improved light-source device including: an excitation light source configured to emit first colored light; an optical element having a reflecting surface to reflect the first colored light emitted from the excitation light source; and a wavelength conversion unit configured to emit the first colored light reflected by the optical element. The wavelength conversion includes a waveform conversion member configured to convert at least a portion of the first colored light reflected by the optical element and incident on the wavelength conversion unit, into second colored light having a wavelength different from a wavelength of the first colored light and emit the second colored light. A point P does not intersect with a light flux Q where the point P is a center of the first colored light on the reflecting surface of the optical element and the light flux Q is a light flux of the first colored light emitted from the wavelength conversion unit.

In another aspect of this disclosure, there is provided an improved image projection apparatus including the above-described light-source device; an image display element configured to generate an image of light emitted from the light-source device; an illumination optical system configured to guide the light emitted from the light-source device to the image display element; and a projection optical system configured to project the image generated by the image display element.

In even another aspect of this disclosure, there is provided an improved light source optical system including an optical element having a reflecting surface to reflect first colored light emitted from an excitation light source; and a wavelength conversion unit configured to emit the first colored light reflected by the optical element. The wavelength conversion unit includes a waveform conversion member configured to convert at least a portion of the first colored light reflected by the optical element and incident on the wavelength conversion unit, into second colored light having a wavelength different from a wavelength of the first colored light and emit the second colored light. A point P does not intersect with a light flux Q where the point P is a center of the first colored light on the reflecting surface of the optical element and the light flux Q is a light flux of the first colored light emitted from the wavelength conversion unit.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein.

Figure 1A:
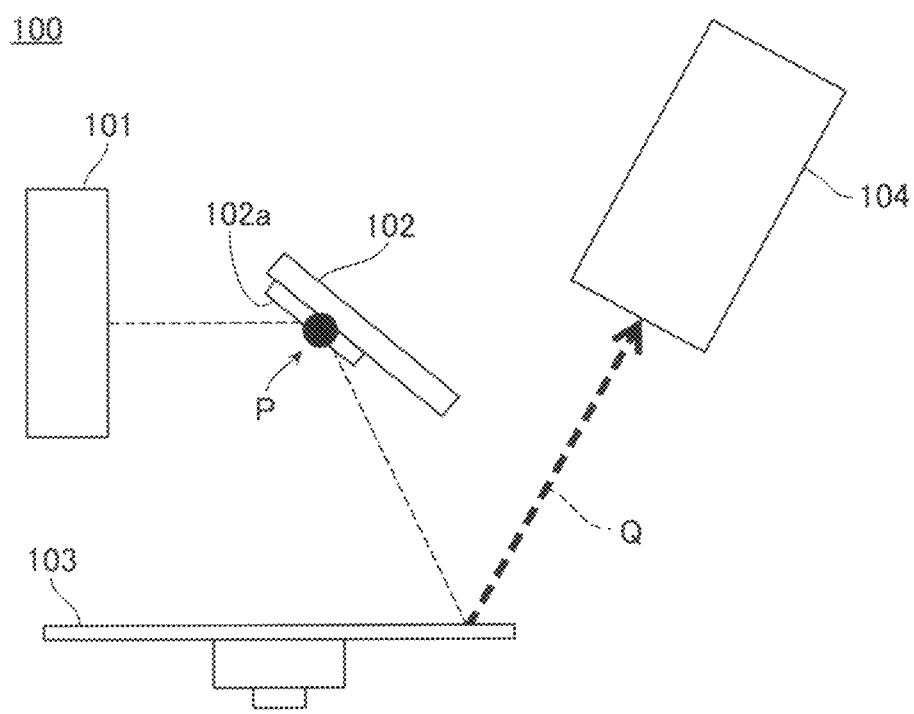
FIGS. 1A and 1B are schematic diagrams of a light-source device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Conventionally, light-source devices are known provided with a DMD and a phosphor wheel whose part is used as a reflector so as to reduce the size of the entire light-source device. In such light-source devices, the excitation light is reflected by the phosphor wheel in the same direction as the fluorescent light, and the reflected light is prevented from returning to the excitation light source by using a phase-contrast plate (quarter (¼) wave retarder) and the polarization splitter.

In the light-source device having such a configuration, the phase-contrast plate (quarter-wave retarder) and the polarization splitter are disposed. This restricts a reduction in the size of the light-source device and also increases the cost. In addition, the optical path of the excitation light proceeding to the phosphor wheel and the optical path of the excitation light reflected from the phosphor wheel pass through the same position in phase-contrast plate or the polarization splitter. For this reason, the light condensing density on these optical elements might increase, and this might cause damage or the like, thus resulting in a decrease in reliability.

The present inventors have paid attention to the fact that such a configuration of the light-source device hampers the downsizing of the device body and the reduction in cost, and also causes a decrease in reliability. Then, the present inventors have conceived of the embodiments of the present disclosure that achieve a reduction in the size of the device body and the cost and an increase in reliability by preventing the optical path of the excitation light proceeding to the phosphor wheel and the optical path of the excitation light reflected from the phosphor wheel from overlapping with each other.

In other words, the embodiments of the present disclosure provide a light-source device including a light source that emits excitation light, an optical element having a reflecting surface that reflects the excitation light emitted from the light source, and a wavelength conversion unit including a wavelength conversion member configured to convert at least some of the excitation light into a fluorescence having a wavelength different from a wavelength of the excitation light and emit the converted fluorescence. In such a light-source device, a point P is prevented from intersecting with a light flux Q where the point P is the center of a projection image of the excitation light projected onto the reflecting surface of the optical element, and the light flux Q is a light flux of excitation light emitted from the wavelength conversion unit.

According to the embodiments, the light flux of the excitation light emitted from the wavelength conversion unit does not intersect with the center of the projection image of the excitation light emitted from the light source. This prevents these pieces of excitation light from passing through the same location on the optical element, which further prevents damage of the optical element due to an increase in the light condensing density. Thus, the reliability can be increased. Further, in the present embodiment, particular optical elements such as a phase-contrast plate and a polarization splitter are not used to separate the optical paths of the excitation light from each other. This reduces the number of components and the cost for producing the device, thus achieving a reduction in the size of the device.

Figure 1B:
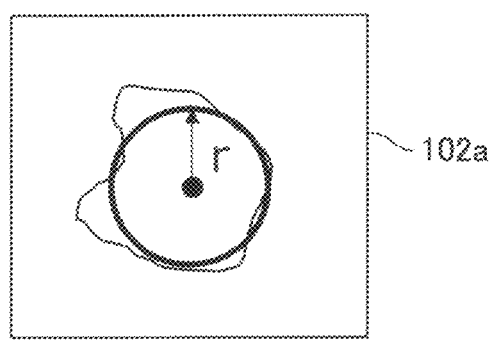

FIGS. 1A and 1B are schematic diagrams of a light-source device 100 according to an embodiment of the present disclosure. FIG. 1A is an illustration of the components of the light-source device 100 according to an embodiment. FIG. 1B is an illustration of excitation light projected onto a reflecting surface 102a of a dichroic mirror 102 of the light-source device 100. FIG. 1B indicates the reflecting surface 102a as viewed from the direction of travel of the excitation light from the light source 101.

As illustrated in FIGS. 1A and 1B, the light-source device 100 according to an embodiment includes a light source (an excitation light source) 101, a dichroic mirror 102 constituting an example of an optical element, a phosphor unit 103 constituting an example of a wavelength conversion unit, and a rod integrator 104 constituting an example of a light mixing device.

The configuration of the light-source device 100 according to the present embodiments is not limited to the configuration illustrated in FIG. 1 and can be appropriately changed. For example, the light-source device 100 may be equipped with the light source 101, the dichroic mirror 102, and the phosphor unit 103 only. In the light-source device 100 equipped with the light source 101, the dichroic mirror 102, and the phosphor unit 103, the components other than the light source 101 constitute a light-source optical system.

The light source 101 emits excitation light (first colored light). The dichroic mirror 102 has a reflecting surface 102a that reflects the excitation light emitted from the light source 101 and guides the excitation light to the phosphor unit 103. The portion of the dichroic mirror 102 other than the reflecting surface 102a may have an optical property that transmits the excitation light emitted from the light source 101 and the fluorescence light emitted from the phosphor unit 103.

The phosphor unit 103 has a first area that reflects or diffuse-reflects the excitation light and a second area that converts at least a part of the excitation light into fluorescence (fluorescence light) (second colored light) having a wavelength different from the wavelength of the excitation light and emits the fluorescence. Once the excitation light is incident on the phosphor unit 103, the phosphor unit 103 alternately emits the excitation light and the fluorescence (fluorescence light) to the incident-plane side (upward in FIG. 1A) on which the excitation light from the light source 101 has been incident, in a sequential manner. The rod integrator 104 is disposed such that the excitation light and the fluorescence emitted from the phosphor unit 103 are directed to and incident on the rod integrator 104. The rod integrator 104 mixes (homogenizes) the incident excitation light and fluorescence to emit the mixed light to the outside of the light-source device 100.

FIG. 1A indicates a case in which the first area of the phosphor unit 103 is provided in the optical path of the excitation light emitted from the light source 101. The excitation light emitted from the light source 101 is reflected by the reflecting surface 102a of the dichroic mirror 102 toward the phosphor unit 103 side. The excitation light reflected by the reflecting surface 102a is reflected by the first area of the phosphor unit 103 toward the incident-plane side on which the reflected excitation light has been incident on the phosphor unit 103. The rod integrator 104 is arranged ahead in the direction of the reflection of the excitation light from the phosphor unit 103.

In the light-source device 100 with the above-described arrangement of the optical path of the excitation light, the center of the excitation light on the reflecting surface 102a of the dichroic mirror 102 is defined as a point P, and the light flux of the excitation light emitted from the phosphor unit 103 is defined as a light flux Q. In the light-source device 100, the dichroic mirror 102, the phosphor unit 103, and the rod integrator 104 are arranged so that the point P and the light beam Q do not intersect with each other.

The point P of the excitation light (the center of the projection image of the excitation light projected onto the reflecting surface 102a) is defined as follows: (1) When the light intensity distribution within the projection range of the excitation light projected onto the reflecting surface 102a is line-symmetric or point-symmetric, the center of the minimum circumscribed circle (circumcircle) of the projection range of the excitation light is set as the center of the projection image center. (2) When the light intensity distribution in the projection range of the excitation light projected on the reflecting surface 102a is a pattern other than the line symmetry or the point symmetry (that is, any case other than the case (1) above), the center P is defined as follows: As illustrated in FIG. 1B, when A denotes the total energy of the excitation light projected onto the reflecting surface 102a and B denotes the total energy of light included in any desired circle with a radius r within the projection range, the ratio of B with respect to A (B/A) is greater than or equal to 93% (B/A≥93%) and the center of the circle with a radius r, at which the energy density is maximum within the circle, is set as the center of the projection image.

Note that the projection range of the excitation light is a range having an energy of $1/e^2$ or more of the maximum energy within the energy distribution of the excitation light projected onto the reflecting surface 102a. The energy density is obtained by dividing the energy included in the circle by the dimension of the circle. In other words, the energy density is obtained by the following equation:

Energy Density=(Energy included in Circle)/(Dimension of Circle)

Note that the center (the point P) of the projection image of the excitation light as defined above is determined with all the light source 101 within the light-source device 100 turned on.

Further, the light flux (light flux Q) of the excitation light emitted from the phosphor unit 103 is a light flux of light rays passing through the range having the energy of $1/e^2$ or more of the maximum energy within the energy distribution of the excitation light on a plane perpendicular to the propagation direction of the excitation light.

In the light-source device 100 according to an embodiment, the light flux Q of the excitation light emitted from the phosphor unit 103 is prevented from intersecting with the center (the point P, i.e., the center of the projection image of the excitation light) of the excitation light emitted from the light source 101 and projected on the reflecting surface 102a. This configuration prevents both the excitation light projected on the reflecting surface 102a and the excitation light emitted from the phosphor unit 103, from passing through the same location on the dichroic mirror 102. Thus, the dichroic mirror 102 is prevented from being damaged due to an increase in the light condensing density. Further, in the present embodiment, particular optical elements such as a phase-contrast plate and a polarization splitter are not used to separate the optical path of the excitation light emitted from the phosphor unit 103, from the other optical path. This configuration reduces the number of components and the cost for producing the device, thus achieving a reduction in the size of the device.

In the light-source device 100 illustrated in FIGS. 1A and 1B, the phosphor unit 103 alternately emits the excitation light and the fluorescence in a sequential manner. In other words, the case in which the phosphor unit 103 emits the excitation light and the fluorescence in a time-division manner is described. However, the configuration of the phosphor unit 103 is not limited thereto, and the phosphor unit 103 may be configured to emit excitation light and fluorescence simultaneously.

For example, instead of the first and second area, the phosphor unit 103 has an area (a third area) that reflects a portion of the excitation light and converts the other portion of the excitation light into a fluorescence having a waveform different from a waveform of the excitation light. For example, the wavelength conversion member provided in the third area serves to perform the reflection of the excitation light and the conversion into the fluorescence. The phosphor unit 103 is sometimes referred to as a stationary phosphor unit. Once the excitation light is incident on the phosphor unit 103, the phosphor unit 103 emits the excitation light and the fluorescence together to the incident-plane side (upward in FIG. 1A) on which the excitation light has been incident on the phosphor unit. In the configuration provided with such a phosphor unit 103 having the third area as well, the same advantageous effect can be exhibited as in the case in which the phosphor unit 103 operates in a time-division manner.

In some examples, the light-source device 100 in FIG. 1 may include a light guide configured to guide at least one of the excitation light and the fluorescence emitted from the phosphor unit 103 to the rod integrator 104. For example, the light guide includes a condenser lens and a constituted by a condenser lens or a refractive lens (refractor), and is arranged in an optical path between the phosphor unit 103 and the rod integrator 104. With the provision of the light guide, at least one of the excitation light and the second colored light emitted from the phosphor unit 103 is effectively guided to the rod integrator 104, and the utilization efficiency of light can be improved.

Figure 2:
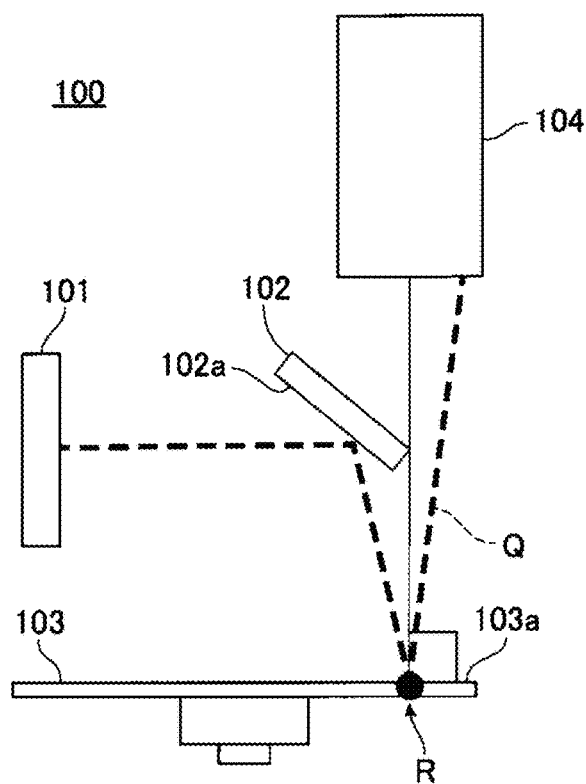
FIG. 2 is a schematic diagram of the light-source device according an embodiment of the present disclosure.

Further, in the light-source device 100 according to an embodiment, the position of the rod integrator 104 may be changed where appropriate from the viewpoint of improving the utilization efficiency of at least one of the excitation light and the fluorescence incident on the rod integrator 104. FIG. 2 is a schematic diagram of the light-source device 100 according another embodiment of the present disclosure. In FIG. 2, the same reference numerals are given to the same components as those in FIG. 1, and the description thereof will be omitted. In the light-source device illustrated in FIG. 2, the reflecting surface 102*a* is formed over the surface of the dichroic mirror 102. The same applies to the figures to be described below.

In the embodiment illustrated in FIG. 2, the center of the projection image of excitation light emitted from the dichroic mirror 102 and projected onto the phosphor unit 103 is designated as a point R. In this case, it is preferably that the rod integrator 104 is disposed on the normal to the point R on the exit plane 103*a* of the phosphor unit 103. With such an arrangement of the rod integrator 104, the fluorescence, which is emitted from the exit plane 103*a* of the phosphor unit 103, can be incident on the rod integrator 104 effectively. Thus, the utilization efficiency of the fluorescence can be improved.

Figure 3:
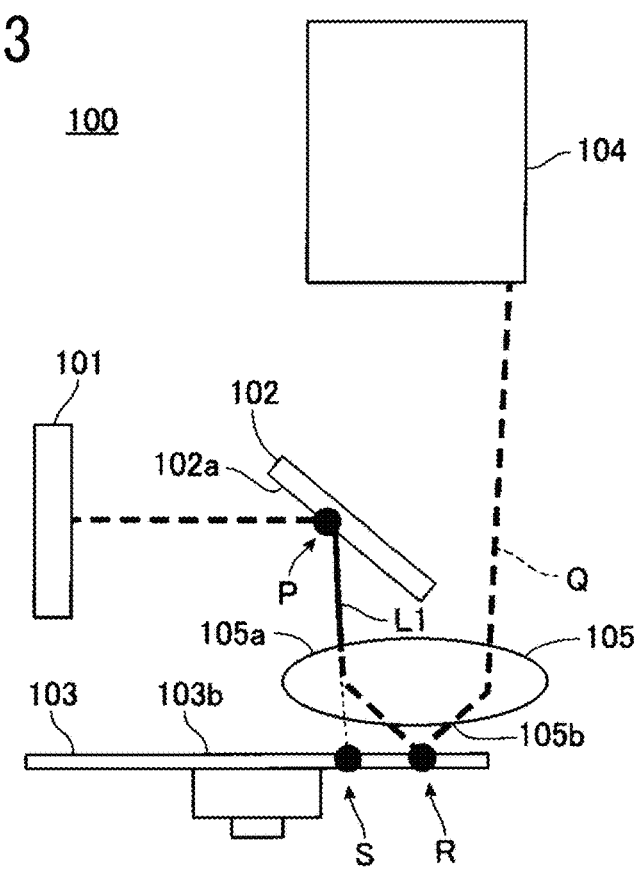
FIG. 3 is a schematic diagram of the light-source device according to an embodiment of the present disclosure.

In some examples, a focusing element may be provided between the dichroic mirror 102 and the phosphor unit 103 in the light-source device 100 according to an embodiment of the present disclosure. Such a focusing element serves to converge the excitation light reflected by the dichroic mirror 102 and substantially collimates the fluorescence emitted from the phosphor unit 103. For example, the focusing element is a condenser lens. FIG. 3 is a schematic diagram of the light-source device 100 according to an embodiment of the present disclosure. In FIG. 3, the same reference numerals are given to the same components as those in FIG. 1, and the description thereof will be omitted.

In the light-source device 100 illustrated in FIG. 3, a condenser lens 105 as the focusing element is disposed in the optical path between the dichroic mirror 102 and the phosphor unit 103. The condenser lens 105 serves to converge the excitation light reflected by the dichroic mirror 102 and substantially collimate the fluorescence emitted from the phosphor unit 103.

FIG. 3 indicates a straight line L1 connecting the above-described point P on the reflecting surface 102*a* and the center of the projection image on an incident plane 105*a* of the condenser lens 105, the projection image being formed by the excitation light that has been reflected by the reflecting surface 102*a* of the dichroic mirror 102 and incident on the condenser lens 105. Further, FIG. 3 also indicates a point S that is a point of intersection of the straight line L1 and an incident plane 103*b* of the phosphor unit 103 on which the excitation light that has been condensed by the condenser lens 105 is incident. In the light-source device 100, the above-described point S is located at a different position from a point R that is the center of the projection image of the excitation light projected onto the phosphor unit 103. With such an arrangement of the condenser lens 105, the excitation light and the fluorescence, which are to be emitted from the phosphor unit 103 while diverging, can be collimated. Accordingly, the collimated excitation light and fluorescence can be incident on the rod integrator 104 effectively, thus improving the utilization efficiency of light.

In the light-source device 100 illustrated in FIG. 3, it is desired that the above-described straight line L1 intersect perpendicularly with the incident plane 103*b* of the phosphor unit 103. With such a configuration that the straight line L1 intersects perpendicularly with the incident plane 103*b* of the phosphor unit 103, the distance between the dichroic mirror 102 and the phosphor unit 103 can be reduced, and the size of the entire light-source device 100 can be reduced.

In the case where light passes through an optical element having a certain thickness, the incident plane is a surface on which the light is incident, and the exit plane is a surface from which the light is emitted. For example, in the condenser lens 105 as illustrated in FIG. 3, the incident plane 105*a* is a surface that light reflected by the reflecting surface 102*a* of the dichroic mirror 102 is incident on, and the exit plane 105*b* is a surface from which the light that has been incident on the incident plane 105*a* and passed through the condenser lens 105 is emitted toward the phosphor unit 103 side.

Figure 4:
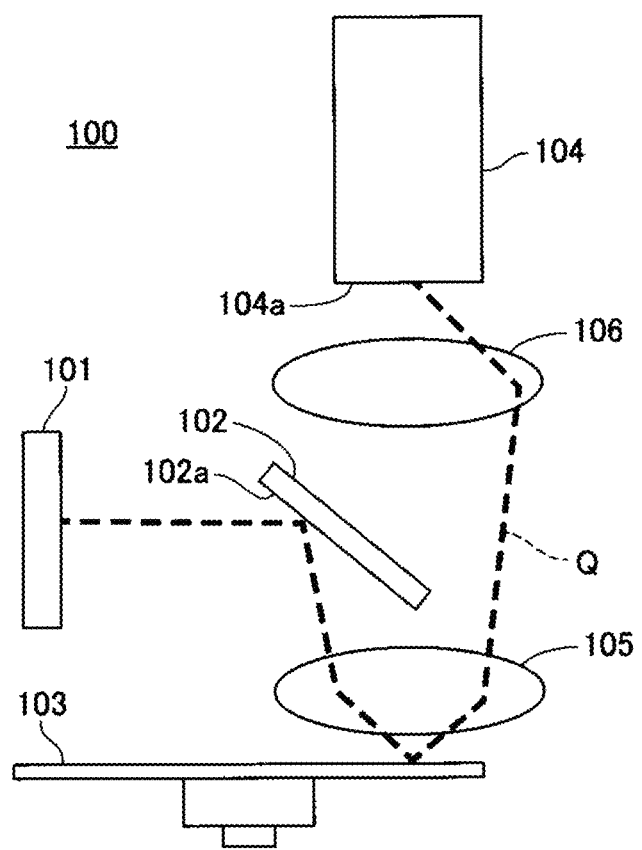
FIG. 4 is a schematic diagram of the light-source device according to an embodiment of the present disclosure.

In some other examples, a refractive optical element may be disposed in the optical path between the condenser lens 105 and the rod integrator 104. Such a refractive optical element serves to converge the excitation light and/or fluorescence collimated by the focusing element (the condenser lens 105) and guide the converged excitation light and fluorescence to the rod integrator 104. For example, the refractive optical element is a refractive lens. FIG. 4 is a schematic diagram of the light-source device 100 according to an embodiment of the present disclosure. In FIG. 4, the same reference numerals are given to the same components as those in FIG. 3, and the description thereof will be omitted.

In the light-source device 100 illustrated in FIG. 4, a refractive lens 106 as the refractive optical element is disposed in the optical path between the condenser lens 105 and the rod integrator 104. The refractive lens 106 serves to condense (refract) the excitation light and/or the fluorescence, which are collimated by the focusing element (condenser lens 105) and guide the converged excitation light and fluorescence light to an incident aperture 104a of the rod integrator 104. With such an arrangement of the refractive lens 106, the excitation light and/or fluorescence collimated by the condenser lens 105 can be efficiently incident on the rod integrator 104, thus improving the utilization efficiency of light.

In the light-source device 100 illustrated in FIG. 4, it is desired that the rod integrator 104 be disposed so as to homogenize the excitation light and/or fluorescence to be incident on the rod integrator 104. More specifically, when the inner surface cross section of the rod integrator 104 is rectangular, preferably, the rod integrator 104 is disposed so that the excitation light or the like to be incident on the rod integrator 104 is incident on the longer side of the inner surface of the rod integrator 104.

Further, in the light-source device 100 in FIG. 4, it is desired that the light source 101 be disposed to substantially prevent vignetting of the excitation light on the reflecting surface 102a of the dichroic mirror 102. More specifically, when the light-emitting surface of the light source 101 is rectangular, preferably, the light source 101 is disposed such that the width of the excitation light is narrower.

Figure 5A:
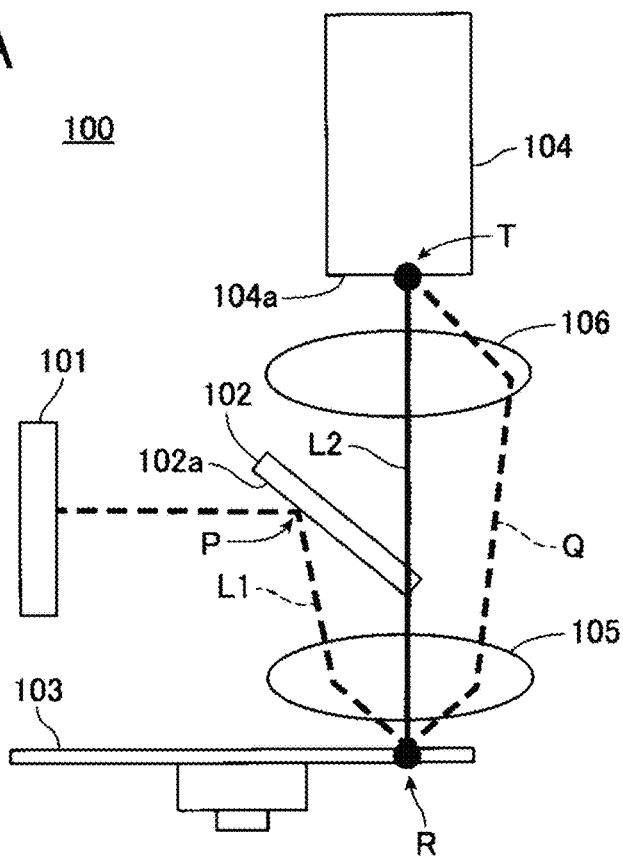
FIGS. 5A, 5B, and 5C are schematic diagrams of the light-source device according to an embodiment of the present disclosure.
Figure 5B:
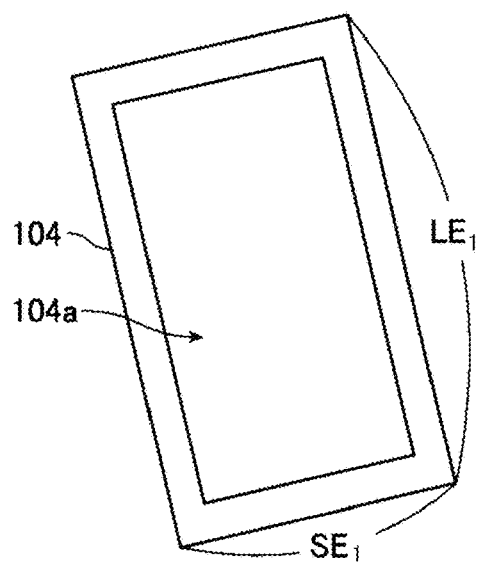
Figure 5C:
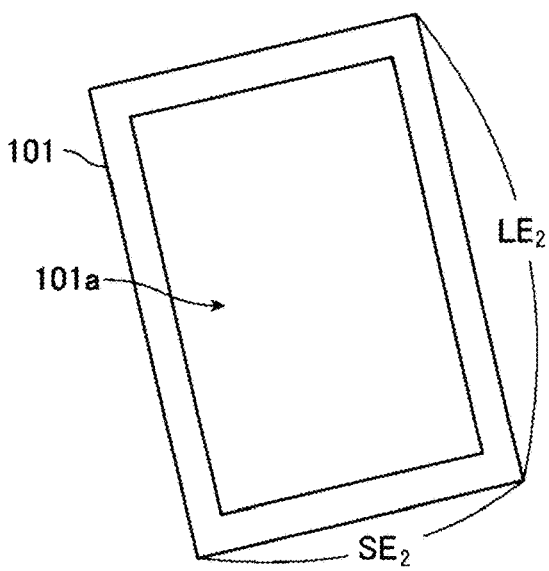

FIGS. 5A, 5B, and 5C are schematic diagrams of the light-source device 100 according to an embodiment. In FIG. 5, the same reference numerals are given to the same components as those in FIG. 4, and the description thereof will be omitted. FIG. 5A is an illustration of the constituent elements of the light-source device 100 according to the present embodiment. FIG. 5B is an illustration of the incident aperture 104a of the rod integrator 104 of the light-source device 100. FIG. 5C is an illustration of the light source 101 of the light-source device 100. FIG. 5B indicates the incident aperture 104a of the rod integrator 104 as viewed from the phosphor unit 103 side. FIG. 5C indicates the light-emitting surface of the light source 101 as viewed from the dichroic mirror 102 side.

In the light-source device 100 illustrated in FIG. 5A, a point T is the center of the projection image projected on the incident aperture 104a of the rod integrator 104, the projection image being formed by the excitation light and/or the fluorescence condensed (refracted) by the refractive lens 106. Further, a straight line L2 is a straight line connecting the point T and a certain point R that is the center of the projection image of the excitation light projected on the phosphor unit 103. As illustrated in FIG. 5B, the incident aperture 104a of the rod integrator 104 has a rectangular shape having a longer side $LE_1$ and a shorter side $SE_1$. Further, as illustrated in FIG. 5C, the light-emitting surface 101a of the light source 101 has a rectangular shape having a longer side $LE_2$ and a shorter side $SE_2$.

In the light-source device 100, preferably, a plane (a plane including the drawing sheet in which FIG. 5A is drawn) including the straight line L1 and the straight line L2 is substantially parallel to the shorter side $SE_1$ of the incident aperture 104a of the rod integrator 104. In other words, the rod integrator 104 is arranged such that the shorter side $SE_1$ of the rod integrator 104 in FIG. 5B is parallel to the drawing sheet of FIG. 5A. With such an arrangement of the rod integrator 104, the excitation light can strike on the inner surface corresponding to the longer side $LE_1$ of the incident aperture 104a of the rod integrator 104 so as to be incident on the rod integrator 104. Accordingly, the number of reflection of the excitation light or the like within the rod integrator 104 is increased, and the excitation light or the like is homogenized, thus preventing unevenness in the color of the excitation light or the like.

In the light-source device 100, preferably, the plane including the straight line L1 and straight line L2 (the plane including the drawing sheet in which FIG. 5A is drawn) is substantially parallel to the shorter side $SE_2$ of the light-emitting surface 101a of the light source 101. In other words, the light source 101 is arranged such that the shorter side $SE_2$ of the light-emitting surface 101a in FIG. 5C is parallel to the drawing sheet of FIG. 5A. With such an arrangement of the light source 101, the width of the light flux extending in a direction in which the plane including the straight lines L1 and L2 extends can be reduced. This prevents vignetting on the reflecting surface 102a of the dichroic mirror 102, and the reduction in the utilization efficiency of light can be prevented. Further, the light reflected by the phosphor unit 103 can be prevented from interfering with the dichroic mirror 102, and the reduction in the utilization efficiency of light can be prevented as well.

Further, in the light-source device 100 according to an embodiment of the present disclosure, the rod integrator 104 is disposed so that an angle formed by the incident aperture 104a and the incident plane on which the excitation light is incident to enter the rod integrator 104 is set within a certain range. For example, in the light-source device 100, the rod integrator 104 is preferably arranged so that the angle formed by the incident aperture 104a and the incident plane on which the excitation light is incident to enter the rod integrator 104 is smaller than a certain angle.

Figure 6A:
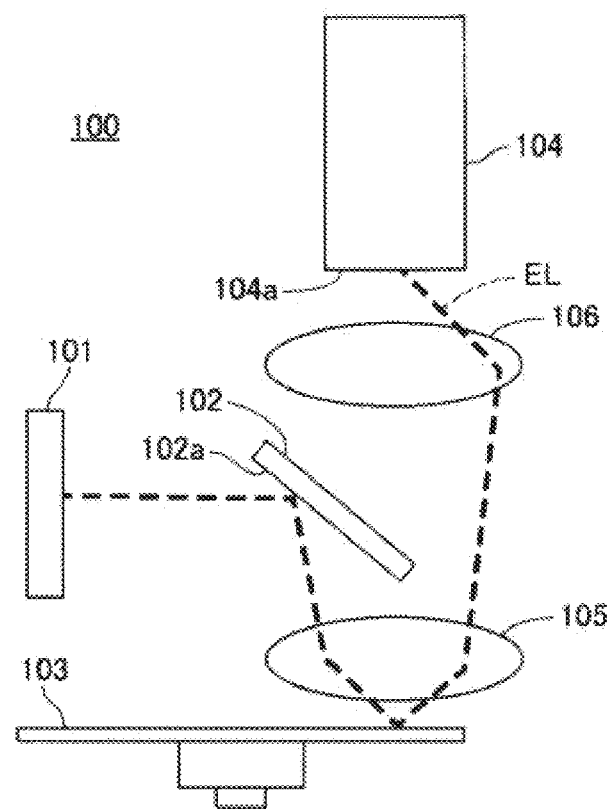
FIGS. 6A and 6B are schematic diagrams of the light-source device according to an embodiment of the present disclosure.
Figure 6B:
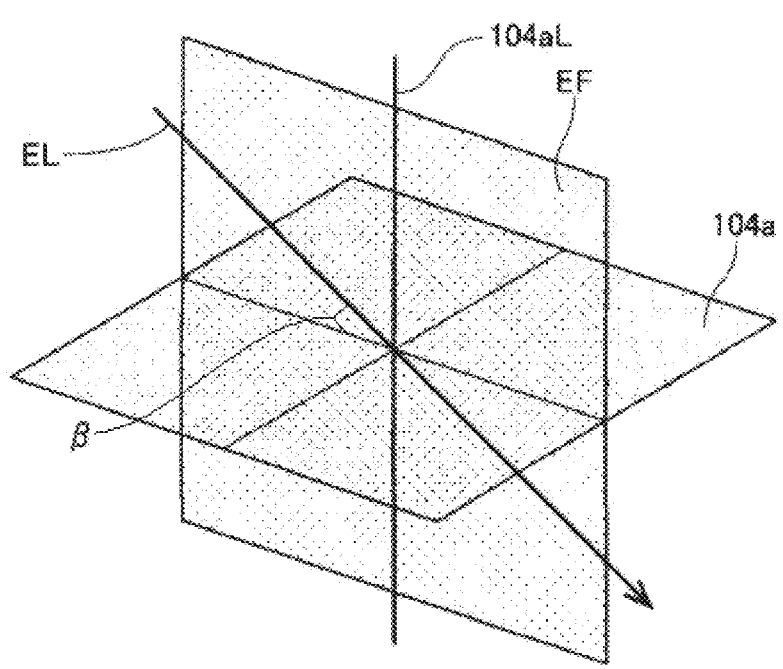

FIGS. 6A and 6B are schematic diagrams of the light-source device 100 according to an embodiment of the present disclosure. In FIGS. 6A and 6B, the same components as those in FIG. 5A are denoted by the same reference numerals, and description thereof will be omitted. FIG. 6A is an illustration of the constituent elements of the light-source device 100 according to the present embodiment. FIG. 6B is an illustration of the incident plane of the excitation light to be incident on the incident aperture 104a of the rod integrator 104 included in the light-source device 100. FIG. 6A indicates the optical path of the excitation light in the light-source device 100.

In the light-source device 100 illustrated in FIG. 6A, the excitation light EL (incident light) is light that is condensed by the refractive lens 106 and incident on the incident aperture 104a. In the light-source device 100, the rod integrator 104 is arranged so that the angle formed by the incident aperture 104a and the excitation light EL on the incident plane of the excitation light EL to be incident on the incident aperture 104a is smaller than 40°.

In the present disclosure, the incident plane is defined as a plane including a normal line of a target surface (a certain surface), on which a certain light ray is incident, and the light ray incident on the target surface. When the plane constituting the incident aperture 104a is the target surface, the incident plane of the excitation light (incident light) EL incident on the incident aperture 104a is a plane EF including the excitation light EL and a normal line 104aL of the incident aperture 104a as illustrated in FIG. 6B.

In the light-source device 100 illustrated in FIG. 6A, the rod integrator 104 is disposed so that an angle β between the incident aperture 104a and the excitation light (incident light) EL incident on the incident aperture 104a is smaller than 40°. With such an arrangement of the rod integrator 104, the excitation light is prevented from being obliquely incident on the rod integrator 104. Accordingly, the excitation light can be sufficiently mixed inside the rod integrator 104, and the unevenness in color can be substantially prevented. As a result, the utilization efficiency of light is improved.

Further, in the light-source device 100 according to an embodiment of the present disclosure, it is desired that the rod integrator 104 be disposed according to the relative position of the refractive lens 106 and the rod integrator 104. For example, in the light-source device 100 according to the present embodiment, the center of the projection image of the excitation light projected onto the incident aperture 104a of the rod integrator 104, the center of the fluorescence projected onto the incident aperture 104a of the rod integrator 104, and the optical axis of the refractive lens 106 intersect at one point.

Figure 7A:
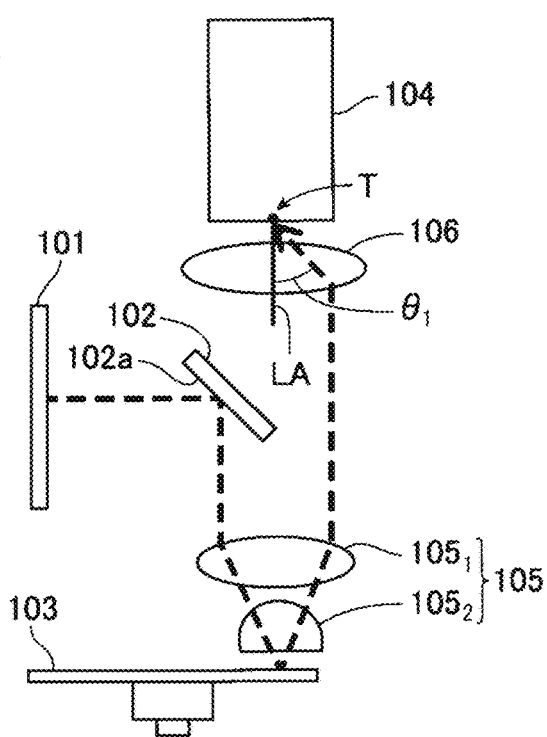
FIGS. 7A and 7B are schematic diagrams of the light-source device according to an embodiment of the present disclosure.
Figure 7B:
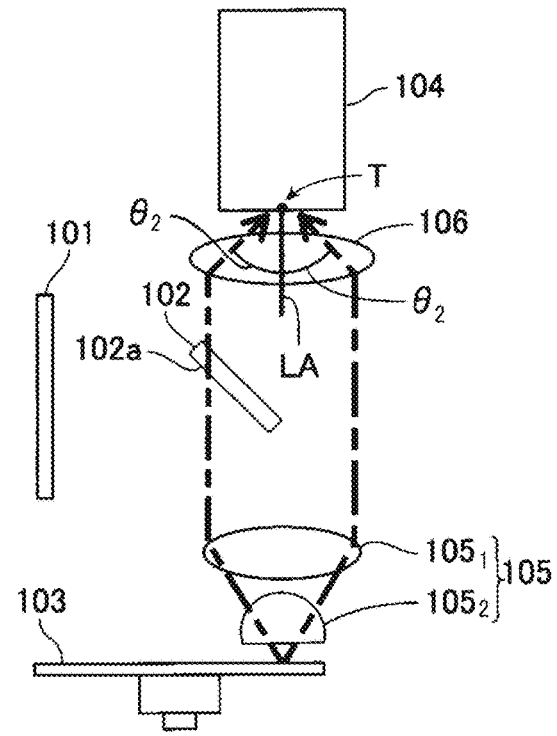

FIGS. 7A and 7B are schematic diagrams of the light-source device 100 according to an embodiment of the present disclosure. In FIGS. 7A and 7B, the same components as those in FIG. 5A are denoted by the same reference numerals, and description thereof will be omitted. FIG. 7A indicates the optical path of the excitation light in the light-source device 100, and FIG. 7B indicates the optical path of the fluorescence in the light-source device 100. FIGS. 7A and 7B also indicate a pair of condenser lenses 1051 and 1052 arranged along the propagation direction of light.

In the light-source device 100 illustrated in FIGS. 7A and 7B, both the center of the projection image on the incident aperture 104a of the rod integrator 104, the projection image being formed by the excitation light converged by the refractive lens 106, and the center of the projection image on the incident aperture 104a of the rod integrator 104, the projection image being formed by the fluorescence converged by the refractive lens 106 are the above-described point T. Further, the refractive lens 106 is arranged so that the optical axis LA of the refractive lens 106 passes through the point T. For this reason, the center of the projection image of the excitation light projected onto the incident aperture 104a of the rod integrator 104, the center of the projection image of the fluorescence projected onto the incident aperture 104a of the rod integrator 104, and the optical axis LA of the refractive lens 106 intersect at one point. This arrangement enables the excitation light and the fluorescence to be incident on the center of the incident aperture 104a of the rod integrator 104, and thus substantially prevents the occurrence of the vignetting on the incident aperture 104a of the rod integrator 104. As a result, the utilization efficiency of light can be improved. In addition, a reduction in the utilization efficiency of light, caused by misalignment of the optical elements within the light-source device 100 due to component tolerances, can also be substantially prevented.

Further, in the light-source device 100 according to the present embodiment, the refractive lens 106 is arranged so that the angle at which each of the excitation light and the fluorescence (fluorescence light) is incident on the incident aperture 104a of the rod integrator 104 is set within a certain range. Note that the angle of the light ray with respect to the incident aperture 104a refers to an angle between the light ray and the normal line of a plane parallel to the incident aperture 104a. For example, in the light-source device 100, the maximum incident angle of a light ray of the excitation light with respect to the incident aperture 104a is smaller than the maximum incident angle of a light ray of the fluorescence with respect to the incident aperture 104a.

As illustrated in FIGS. 7A and 7B, an angle $\theta_1$ is the maximum incident angle of the light ray of the excitation light with respect to the incident aperture 104a, and an angle $\theta_2$ is the maximum incident angle of the light ray of the fluorescence with respect to the incident aperture 104a. In the light-source device 100, it is desired that the angle $\theta_1$ be set smaller than the angle $\theta_2$. By making the incident angle $\theta_1$ of the excitation light smaller than the incident angle $\theta_2$ of the fluorescence, the occurrence of vignetting in an optical system arranged downstream of the light-source device 100 is substantially prevented, and thus the utilization efficiency of light is improved.

In the light-source device 100 according to an embodiment of the present disclosure, the incident angle $\theta_1$ of the excitation light and the incident angle $\theta_2$ of the fluorescence may be set equal to each other. By making the incident angle $\theta_1$ of the excitation light equal to the incident angle $\theta_2$ of the fluorescence, the distribution of the excitation light projected on the DMD or the screen is made substantially the same as the distribution of the fluorescence projected on the DMD or the screen. Accordingly, the unevenness in the color of the excitation light or the like can be substantially prevented.

Further, in the light-source device 100 according to the present embodiment, the optical properties of the rod integrator 104 may be selected according to the relation of the incident angle $\theta_1$ of the excitation light and the incident angle $\theta_2$ of the fluorescence. For example, in the light-source device 100, the rod integrator 104 is formed of a glass rod integrator, and the total reflection condition of the glass rod integrator is set to be larger than the incident angle $\theta_1$ of the excitation light and the incident angle $\theta_2$ of the second colored light.

Figure 8:
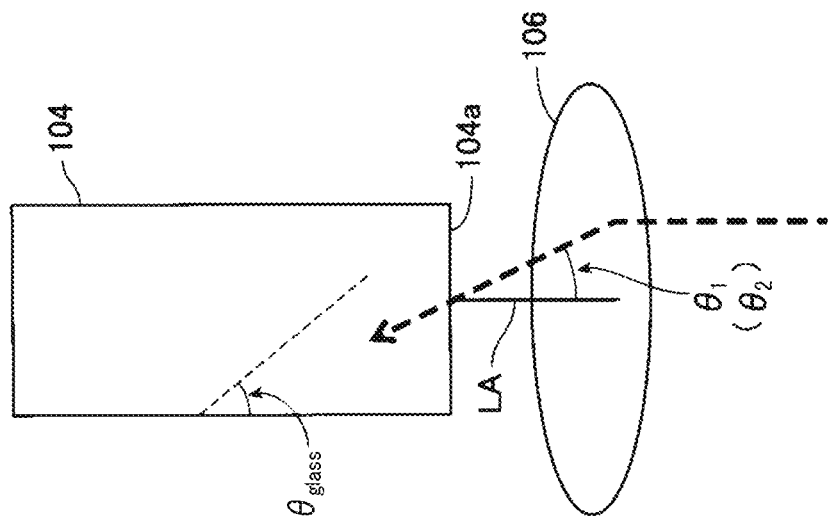
FIG. 8 is a schematic diagram for describing the optical properties of the rod integrator in the light-source device according to an embodiment of the present disclosure.

FIG. 8 is a schematic diagram for describing the optical properties of the rod integrator 104 in the light-source device 100 according to an embodiment of the present disclosure. In the light-source device 100 illustrated in FIG. 8, the rod integrator 104 is formed of a glass rod integrator. The total reflection condition in the rod integrator 104 is assumed to be an angle $\theta_{glass}$. In this case, the angle $\theta_{glass}$ is set to be larger than the incident angle $\theta_1$ of the excitation light and the incident angle $\theta_2$ of the fluorescence. With such a configuration, loss of the excitation light and the like inside the rod integrator 104 is prevented, and thus the utilization efficiency of light is improved.

Figure 9:
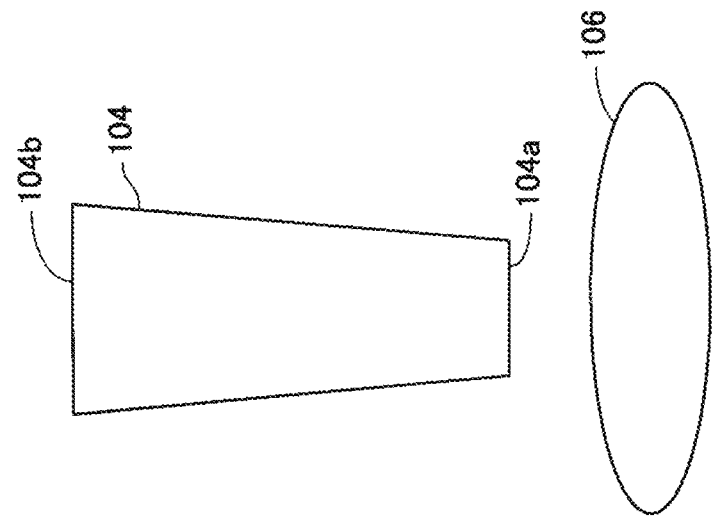
FIG. 9 is a schematic diagram for describing the optical properties of the rod integrator in the light-source device according to another embodiment of the present disclosure.

FIG. 9 is also a schematic view for describing the optical properties of the rod integrator 104 included in the light-source device 100 according to another embodiment of the present disclosure. In the light-source device 100 in FIG. 9, the rod integrator 104, which constitutes a light mixing device, has a tapered shape in which the incident aperture 104a is smaller than an exit aperture 104b. With such a tapered shape of the rod integrator 104, the exit angle at which light exits the rod integrator 104 can be made small. Accordingly, the occurrence of vignetting in an optical system arranged downstream of the light-source device 100 can be substantially prevented, and thus the utilization efficiency of light can be improved.

The embodiments of the present disclosure are described below. The embodiments described below indicate some examples of the light source optical system, the light-source device, and the image projection apparatus, and the configurations thereof may be changed where appropriate. Further, the respective embodiments may be combined where appropriate.

Figure 10:
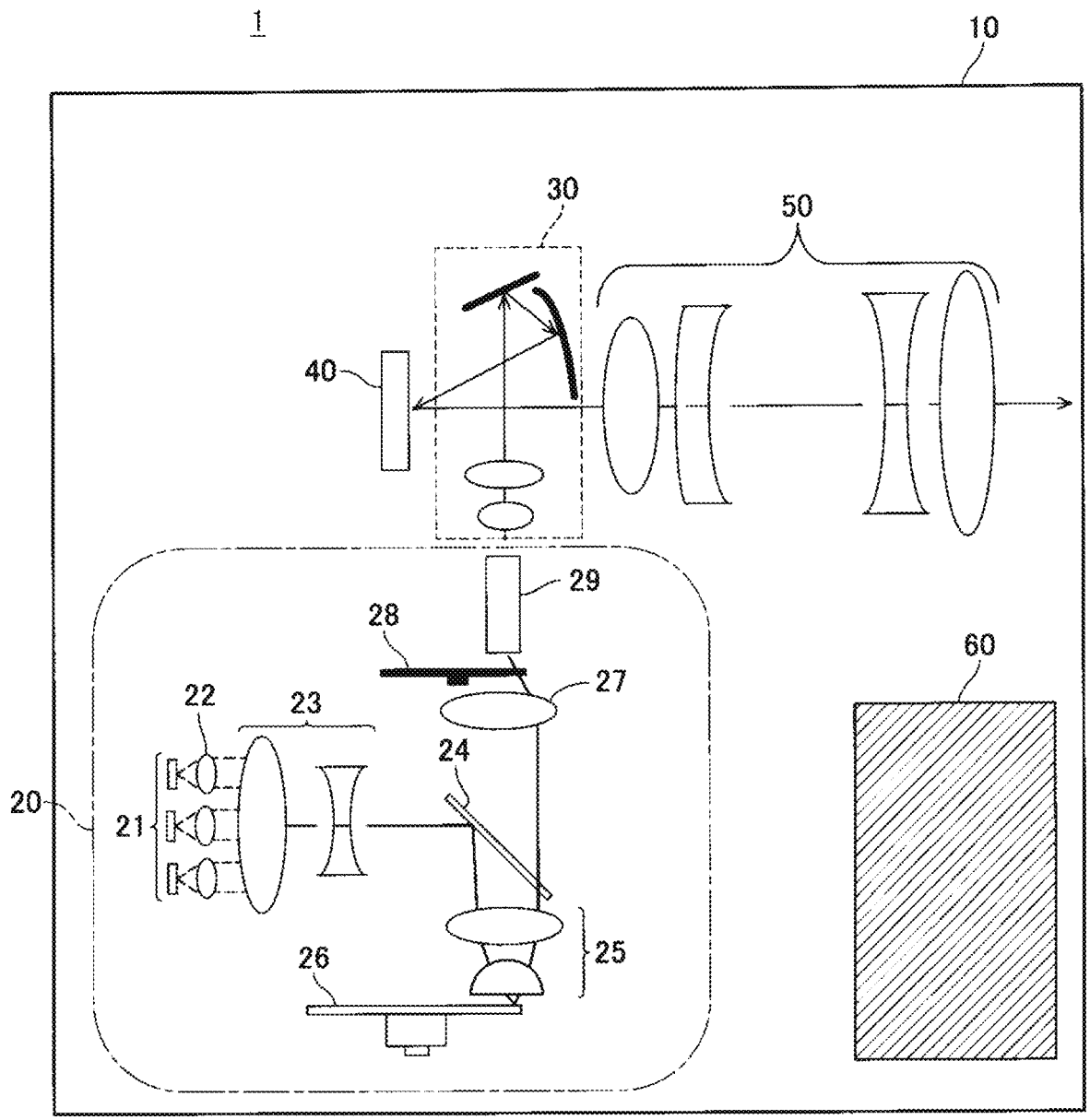
FIG. 10 is a schematic diagram of a projector provided with a light-source device according to a first embodiment.

FIG. 10 is a schematic diagram of a projector 1 (image projection apparatus) provided with a light-source device 20 according to a first embodiment. As illustrated in FIG. 10, the projector 1 includes a housing 10, a light-source device 20, an illumination optical system 30, an image forming element (image display element) 40, a projection optical system 50, and a cooling device 60.

The housing 10 houses the light-source device 20, the illumination optical system 30, the image forming element 40, the projection optical system 50, and the cooling device 60. The light-source device 20 emits, for example, light beams having wavelengths corresponding to colors of RGB. An inner configuration of the light-source device 20 is described later in detail.

The illumination optical system 30 illuminates the image forming element 40 substantially uniformly with the light uniformized by a light tunnel 29, which is described later, included in the light-source device 20. The illumination optical system 30 includes, for example, one or more lenses and one or more reflecting surfaces.

The image forming element 40 modulates light provided for illumination by the illumination optical system 30 (light from a light-source optical system of the light-source device 20) to form an image. The image forming element 40 includes, for example, a digital micromirror device (DMD) or a liquid crystal display element. The image forming element 40 drives the minute mirror surface in synchronization with light beams (blue light, green light, red light, and yellow light) emitted from the illumination optical system 30, and generates a color image.

The projection optical system 50 magnifies and projects the image (the color image) formed by the image forming element 40 onto a screen (projection surface). The projection optical system 50 includes, for example, at least one lens. The cooling device 60 cools each of the elements and devices that take heat in the projector 1.

Figure 11A:
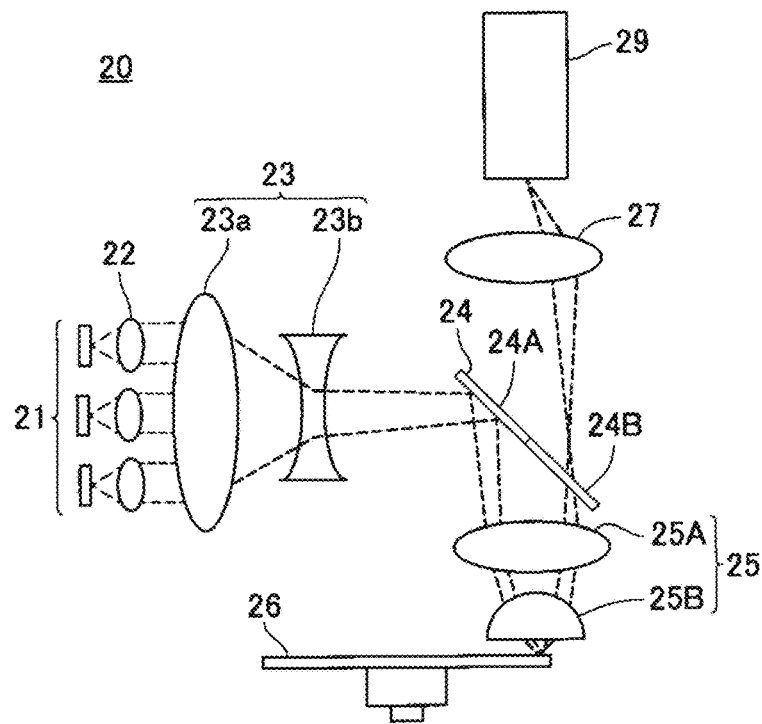
FIGS. 11A and 11B are schematic views of the light-source device according to the first embodiment.
Figure 11B:
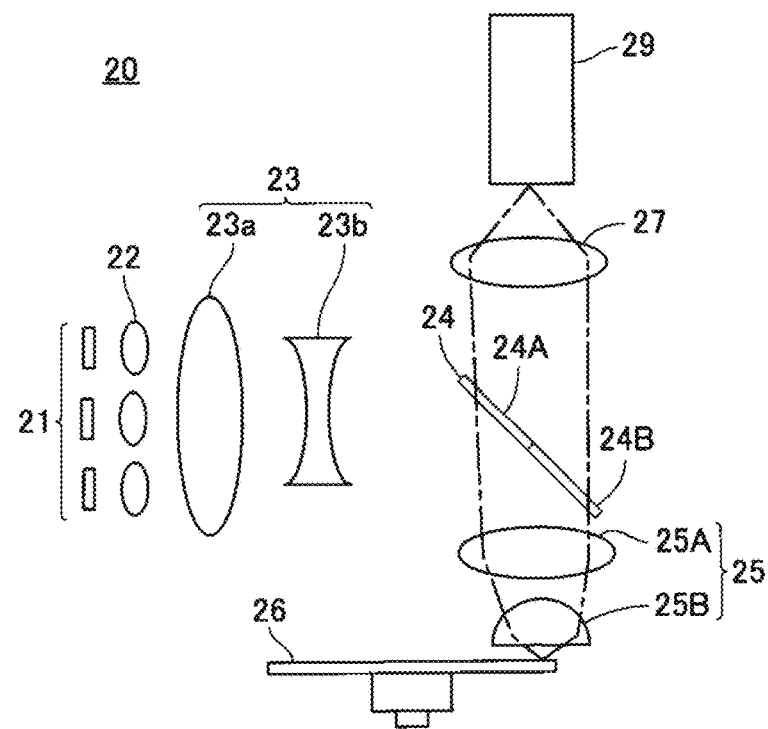

FIGS. 11A and 11B are illustrations of the configuration of the light-source device 20 according to the first embodiment. FIG. 11A indicates the optical path of the blue laser beam in the light-source device 20, and FIG. 11B indicates the optical path of the fluorescence in the light-source device 20.

As illustrated in FIG. 11A, the light-source device 20 includes a laser source (excitation light source) 21, a coupling lens 22, a first optical system 23, and a dichroic mirror 24 that is an example of an optical element, a second optical system 25, a phosphor unit 26 as an example of the wavelength conversion unit, a refractive optical system 27, a color wheel 28, and a light tunnel 29 as an example of the light mixing element, which are sequentially arranged in the light propagation direction.

The color wheel 28 is described with reference to FIG. 10. In the present embodiment, the color wheel 28 is described as a component of the light-source device 20. However, the configuration of the light-source device 20 is not limited thereto, and the color wheel 28 may not be included in the light-source device 20.

In the laser source 21, for example, a plurality of light sources are arranged in array to emit a plurality of laser beams. The laser source 21 emits, for example, light (blue laser beam) in a blue band where the center wavelength of emission intensity is 455 nm. Hereinafter, the blue laser beam is referred to simply as blue light. The blue light emitted from the laser source 21 is linearly polarized light whose polarization direction is a specific direction, and is also used as excitation light that is excited by fluorescent material or phosphor of the phosphor unit 26, which is to be described later.

The light emitted by the laser source 21 is not limited to light in the blue wavelength band and may be light with wavelengths that can excite the fluorescent material. Further, the laser source 21 has a plurality of light sources in the first embodiment, but is not limited thereto. In some examples, the laser source 21 may be configured by one light source. In addition, the laser source 21 may be configured as a plurality of light sources arranged in array on a substrate, but is not limited thereto, and may have another arrangement configuration.

The coupling lens 22 is a lens that receives blue light emitted from the laser source 21 and converts the blue light into parallel light (collimated light). In the following description, the term "parallel light" is not limited to light that is completely collimated (parallelized), but includes substantially collimated light. The number of coupling lenses 22 may be increased or decreased in accordance with an increase or a decrease in the number of light sources of the laser source 21 so as to correspond to the number of light sources of the laser source 21.

In the light-source device 20 according to the present embodiment, the laser source 21 and the coupling lens 22 constitute a light source unit. For example, the laser source 21 is configured by a plurality of laser diodes arranged in rows and columns. In other words, the light source unit includes the laser diodes and the coupling lenses 22 arranged on the light-emission surface side of the laser diodes.

Figure 12:
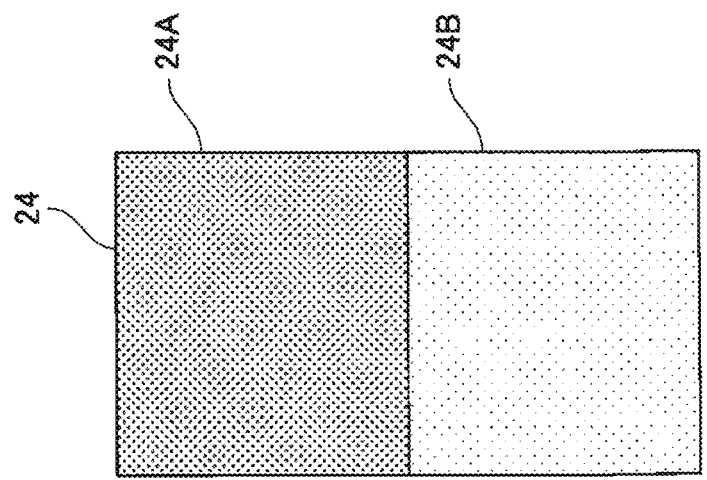
FIG. 12 is an illustration of the outline of a light source unit included in the light-source device according to the first embodiment.

FIG. 12 is an illustration of a main part of the light source unit included in the light-source device 20 according to the first embodiment. In the light source unit illustrated in FIG. 12, each coupling lens 22 is arranged to face a laser diode 21A. In the light source unit, when θ denotes a divergence angle of the blue light (excitation light) emitted from each laser diode 21A, the divergence angle being larger one between the row direction and the column direction, P denotes a pitch between adjacent laser diodes 21A, and L denotes a distance from a light-emitting point of a laser diode 21A to a corresponding coupling lens 22, the interval (P/L tan θ) between the laser diodes 21A is configured to satisfy Formula (1) below:

$$1 \leq P/L \tan \theta \leq 4 \qquad (1)$$

Most preferably, the interval between the laser diodes 21A is configured to satisfy Formula (2) below:

$$P/L \tan \theta = 2 \qquad (2)$$

Satisfying Formula (2) enables the downsizing of the light-diode 21A to be incident on only the corresponding one of the coupling lenses 22. Accordingly, the light emitted from each laser diode 21A is prevented from being erroneously incident on another coupling lens adjacent to the corresponding coupling lens. Thus, a decrease in the utilization efficiency of light can be substantially prevented.

Note that the plurality of laser diodes 21A included in the light source unit are preferably arranged on the same substrate. With such an arrangement of the plurality of laser diodes 21A on the same substrate, the area of light emitted from the light source unit can be reduced, so that vignetting of light in various optical elements on the optical path can be substantially prevented. Thus, the utilization efficiency of light can be improved.

The first optical system 23 has positive power as a whole, and includes a large-diameter lens 23a and a negative lens 23b in order from the laser source 21 side to the phosphor unit 26 side. The large-diameter lens 23a is an example of a large-diameter element, and has positive power. The large-diameter lens 23a is a lens that converges and combines the collimated light beams emitted from the coupling lenses 22. The negative lens 23b is an example of a collimating element, and is configured by a lens that converts the blue light converged by the large-diameter lens 23a into parallel light (collimated light). The first optical system 23 guides the blue light (excitation light) that has been substantially collimated by the coupling lens 22 and has been incident on the first optical system 23 to the dichroic mirror 24 while converging the blue light.

The dichroic mirror 24 is arranged obliquely with respect to the propagation direction of the blue light emitted from the first optical system 23. More specifically, the dichroic mirror 24 is disposed with the front end portion tilted downward with respect to the propagation direction of the blue light emitted from the first optical system 23. The dichroic mirror 24 has an optical property that is capable of reflecting the blue light substantially collimated by the first optical system and also capable of transmitting the fluorescence (the second colored light) converted by the phosphor unit 26. For example, the dichroic mirror 24 is provided with a coat having the above-described optical property.

Figure 13:
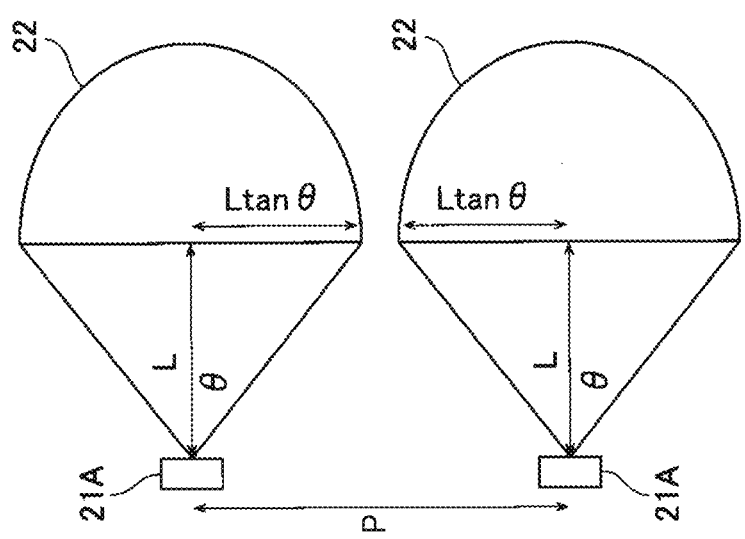
FIG. 13 is an illustration of an example of the dichroic mirror of the light-source device according to the first embodiment.

FIG. 13 is an illustration of an example of the dichroic mirror 24 of the light-source device 20 according to the first embodiment. FIG. 13 indicates the dichroic mirror 24 as viewed from the incident direction of the blue light emitted from the first optical system 23 side. As illustrated in FIG. 13, the dichroic mirror 24 is divided into two regions 24A and 24B. Hereinafter, the regions 24A and 24B are referred to as a first region 24A and a second region 24B, respectively.

The first region 24A has the optical property that reflects the blue light emitted from the first optical system 23 (the negative lens 23b) while transmitting the fluorescence converted from the blue light by the phosphor of the phosphor unit 26 to be described later. The first region 24A forms the reflecting surface 102a as illustrated in FIG. 1A. The second region 24B has an optical property capable of transmitting the blue light and the fluorescence.

The first region 24A is disposed on the optical axis of the first optical system 23, but is not disposed on the optical axis of the second optical system 25. The first region 24A is disposed closer to the first optical system 23 (the negative lens 23b) side relative to the optical axis of the second optical system 25. The second region 24B is not disposed on the optical axis of the second optical system 25, and disposed closer to the opposite side of the first optical system 23 relative to the optical axis of the second optical system 25.

The second optical system 25 has positive power as a whole, and includes a positive lens 25A and a positive lens 25B in order from the laser source 21 side to the phosphor unit 26 side. The second optical system 25 serves to converge the blue light reflected by the dichroic mirror 24 while guiding the blue light to the phosphor unit 26. Further, the second optical system 25 collimates the fluorescence light (the fluorescence) emitted from the phosphor unit 26. Note that the second optical system 25 is an example of the focusing element.

The blue light guided by the second optical system is incident on the phosphor unit 26. The phosphor unit 26 switches between the function of reflecting the blue light emitted from the second optical system 25 and the function of causing the blue light to work as the excitation light while converting the blue light into fluorescence having a different wavelength band from a wavelength band of the blue light by using the phosphor. The fluorescence converted by the phosphor unit 26 is, for example, light in a yellow wavelength band where the center wavelength of the emission intensity is 550 nm.

Figure 14B:
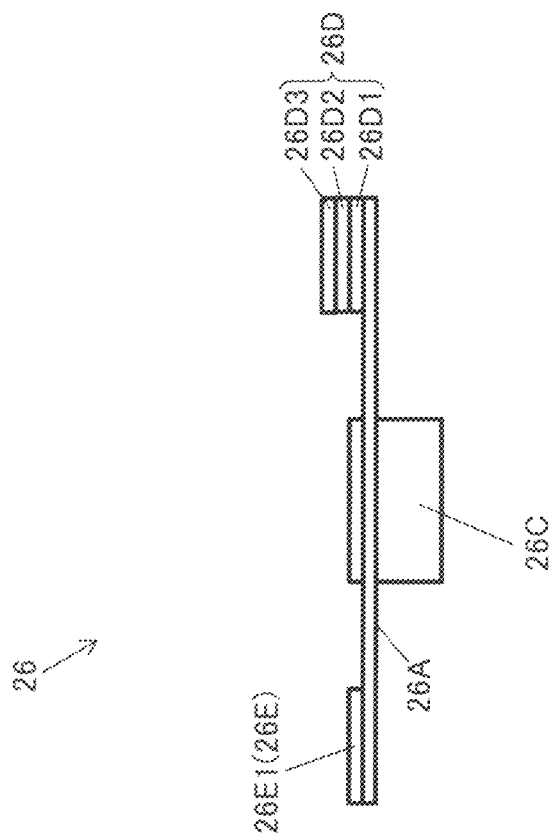
FIGS. 14A and 14B are illustrations of a configuration of a phosphor unit in the light-source device according to the first embodiment.
Figure 14A:
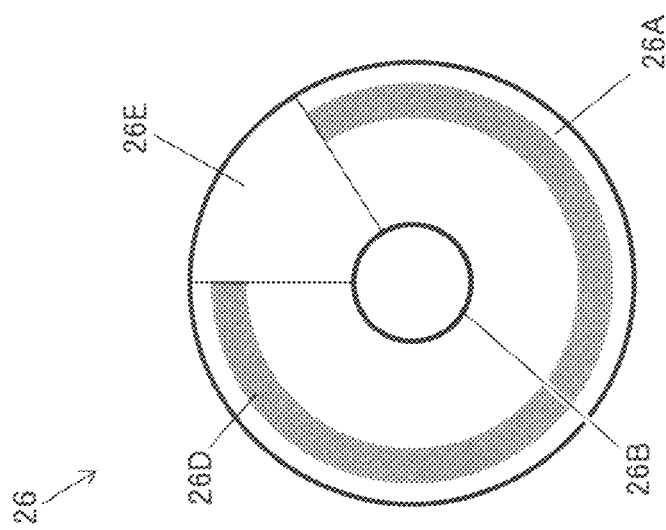

FIGS. 14A and 14B are illustrations of the configuration of the phosphor unit 26 of the light-source device 20 according to the first embodiment. In FIG. 14A, the phosphor unit 26 is viewed from the incident direction of the blue light. In FIG. 14B, the phosphor unit 26 is viewed from the direction orthogonal to the incident direction of the blue light. The configuration of the phosphor unit 26 illustrated in FIGS. 14A and 14B is only one example, is not limited thereto, and may be changed where appropriate.

As illustrated in FIG. 14A, the phosphor unit 26 includes a disk member (substrate or a disk body) 26A and a drive motor 26C (a drive unit) driven to rotate around a rotation axis 26B that is the straight line perpendicular to a plane of the disk member 26A. The disk member 26A may be, but is not limited to, for example, a transparent substrate or a metal substrate (for example, an aluminum substrate).

A large portion in the circumferential direction (in the first embodiment, an angular range of larger than 270°) of the phosphor unit 26 (disk member 26A) is assigned to a fluorescent region 26D, and a small portion in the circumferential direction (in the first embodiment, an angular range of smaller than 90°) is assigned to an excitation-light reflective region 26E. The excitation-light reflective region 26E constitutes an example of a first area that reflects (or diffusely reflects) the excitation light reflected by the dichroic mirror 24. The fluorescent region 26D constitutes an example of an area that converts the excitation light reflected by the dichroic mirror 24 into fluorescence (fluorescence light) and emits the fluorescence light. The fluorescent region 26D includes a reflection coat 26D1, a phosphor layer 26D2, and an anti-reflection coat (AR coat) 26D3 layered in this order from a lower-layer side toward an upper-layer side.

The reflection coat 26D1 has a characteristic of reflecting light in a wavelength region of the fluorescence (emission) by the phosphor layer 26D2. When the disk member 26A is made of a metal substrate with high reflectivity, the reflection coat 26D1 may be omitted. In other words, the disk member 26A may have the function of the reflection coat 26D1.

The phosphor layer 26D2 may use, for example, a substance in which a fluorescent material is dispersed into an organic or inorganic binder, a substance in which a crystal of a fluorescent material is directly formed, or a rare-earth phosphor such as a Ce:YAG-based substance. The phosphor layer 26D2 forms an example of a wavelength conversion member that converts at least a portion of the excitation light into fluorescence light having a wavelength different from that of the excitation light and emits the fluorescence light. The wavelength band of the fluorescence (emission or emitted light) by the phosphor layer 26D2 may be, for example, the wavelength band of yellow, blue, green, or red. In the first embodiment, an example is described in which fluorescence (emission) has the wavelength band of yellow. While the fluorescence material is used as the wavelength conversion element in this embodiment, a phosphorescent body or a non-linear optical crystal may be used.

The anti-reflection coat 26D3 has a characteristic of preventing reflection of light at a surface of the phosphor layer 26D2.

A reflection coat (reflecting surface) 26E1 having a characteristic of reflecting light in the wavelength region of the blue light guided from the second optical system 25 is layered on the excitation-light reflective region 26E. When the disk member 26A is made of a metal substrate with high reflectivity, the reflection coat 26E1 may be omitted. In other words, the disk member 26A may have the function of the reflection coat 26E1.

By driving the disk member 26A to rotate by the drive motor 26C, the irradiation position of the blue light on the phosphor unit 26 moves with time. Consequently, a portion of the blue light (first colored light) incident on the phosphor unit 26 is converted by the fluorescent region (wavelength conversion region) 26D into fluorescence (second colored light) with a wavelength different from the wavelength of the blue light (first colored light) and the fluorescence is emitted. The other portion of the blue light incident on the phosphor unit 26 is reflected by the excitation-light reflective region 26E without a change from the blue light.

The numbers and ranges of the fluorescent region 26D and the excitation-light reflective region 26E can be freely determined, and various changes can be made in design. For example, two fluorescent regions and two excitation-light reflective regions may be alternately arranged in the circumferential direction at intervals of 90°.

Returning to FIGS. 11A and 11B, the description of the configuration of the light-source device 20 will be continued. The refractive optical system 27 is a lens that condenses (converges) light (blue light and fluorescence) emitted from the second optical system 25. The light (blue light and fluorescence) emitted from the phosphor unit 26 passes through the dichroic mirror 24, and is then condensed (refracted) by the refractive optical system 27. Thus, the condensed light is incident on the color wheel 28 (see FIG. 10). The color wheel 28 is a member that separates the blue light and fluorescence light (fluorescence) generated by the phosphor unit 26 into desired colors.

Figure 15A:
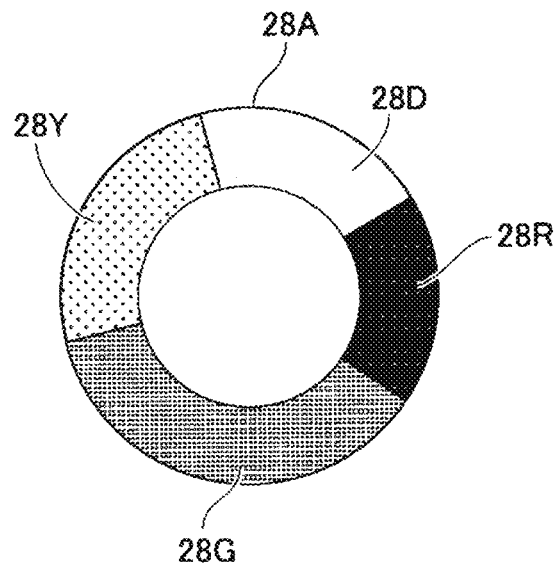
FIGS. 15A and 15B are illustrations of a configuration of a color wheel in the light-source device according to the first embodiment.
Figure 15B:
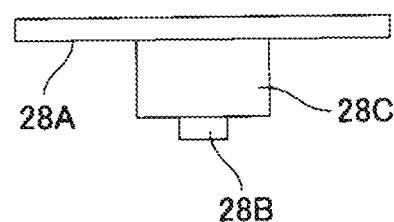

FIGS. 15A and 15B are illustrations of the configuration of the color wheel 28 of the light-source device 20 according to the first embodiment. In FIG. 15A, the color wheel 28 is viewed from the incident direction of the blue light and the fluorescence. In FIG. 15B, the color wheel 28 is viewed from the direction orthogonal to the incident direction of the blue light and the fluorescence. As illustrated in FIGS. 15A and 15B, the color wheel 28 includes a toroidal-shape member 28A and a drive motor (drive unit) 28C that drives the toroidal-shape member 28A to rotate around a rotation axis 28B.

The toroidal-shape member 28A is divided into a plurality of regions along the circumferential direction. In the toroidal-shape member 28A, the regions divided along the circumferential direction are a diffusion region 28D and filter regions 28R, 28G, and 28Y. The diffusion region 28D is a region that transmits and diffuses the blue light emitted from the phosphor unit 26. The filter region 28R is a region that transmits light having the wavelength range of the red component of the fluorescence emitted from the phosphor unit 26. Similarly, the filter regions 28G and 28Y are regions that transmit light having the wavelength range of the green component and light having the wavelength range of the yellow component of the fluorescence emitted from the phosphor unit 26, respectively.

In the above description, it is assumed that the color wheel 28 has regions through which the red, green, and yellow components of the fluorescence (the fluorescence light) are transmitted. However, the configuration of the color wheel 28 is not limited thereto. For example, the color wheel 28 may have regions through which a red component and a green component of the fluorescence light are transmitted.

The area ratio between the regions is determined based on design specification of the projector 1. However, for example, since the diffusion region 28D in the color wheel 28 transmits the blue light emitted from the phosphor unit 26, the area ratio of the excitation-light reflective region 26E with respect to the entire area of the disk member 26A of the phosphor unit 26 may be equal to the area ratio of the diffusion region 28D with respect to the entire area of the color wheel 28.

The drive of the drive motor 28C rotates the toroidal-shape member 28A in the circumferential direction. With the rotation of the toroidal-shape member 28A in the circumferential direction, the blue light emitted from the phosphor unit 26 is incident on the diffusion region 28D and the fluorescence emitted from the phosphor unit 26 is sequentially incident on the filter regions 28R, 28G, and 28Y. The light (the blue light and the fluorescence) emitted from the phosphor unit 26 is transmitted through the color wheel 28, so that the blue light, green light, red light, and yellow light are sequentially emitted from the color wheel 28. The light transmitted through each region of the color wheel 28 is then incident on the light tunnel 29.

The light tunnel 29 is an optical element in which four mirrors form inner surfaces of a quadrangular prism. The light tunnel 29 serves as a light uniformizing element to cause the light incident on the one end of the quadrangular prism to be reflected plural times by the inner mirrors so as to make the distribution of the light uniform. The light tunnel 29 is disposed to enable the light (blue light and fluorescence) condensed by the refractive optical system 27 to be incident on the light tunnel 29. In the first embodiment, the light tunnel 29 is described as an example of the light mixing element. However, no limitation is intended thereby. Alternatively, the light tunnel 29 may be, for example, a rod integrator or a fly-eye lens.

Figure 16A:
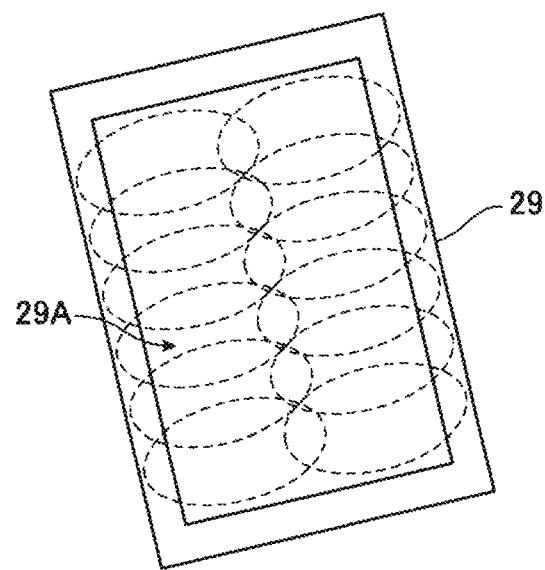
FIGS. 16A and 16B are illustrations of an incident aperture of a light tunnel in the light-source device according to the first embodiment, as viewed from the incident direction of light.
Figure 16B:
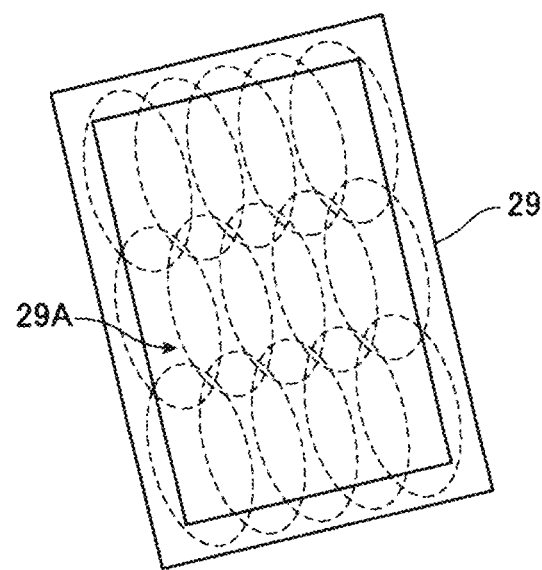

FIGS. 16A and 16B are illustrations of an incident aperture 29A of the light tunnel 29 in the light-source device 20 according to the first embodiment, as viewed from the incident direction of light. FIGS. 16A and 16B each indicates a projection range of the blue light projected onto the incident aperture 29A of the light tunnel 29. The light tunnel 29 is arranged slightly tilted as illustrated in FIGS. 16A and 16B. The tilt angle of the light tunnel 29 is determined depending on a desired performance of the light-source device 20.

In the light source unit of the light-source device 20 according to the first embodiment, as described above, the laser sources 21 (laser diodes 21A) are arranged in array. As illustrated in FIGS. 16A and 16B, each projection range on the incident aperture 29A of the light tunnel 29 has an elliptical shape, each projection range being a range in which the blue light or the like emitted from a laser diode 21A is projected onto the incident aperture 29A (see FIGS. 16A and 16B). For example, as illustrated in FIG. 16B, the projection ranges of the blue light or the like on the incident aperture 29A are arranged such that the major axis of the elliptical shape of each projection range is substantially parallel to the short side of the incident aperture 29A. With such an arrangement of the projection ranges of the blue light or the like on the incident aperture 29A, the occurrence of the vignetting of the blue light or the like in the light tunnel 29 can be prevented. For another example as illustrated in FIG. 16B, the projection ranges of the blue light or the like on the incident aperture 29A may be arranged such that the major axis of the elliptical shape of each projection range is substantially parallel to the long side of the incident aperture 29A. In the present embodiment, the elliptical shape refers to a shape having a difference between the full width at half maximum (FWHM) of the intensity distribution in the vertical direction of the projection range and the full width at half maximum (FWHM) of the intensity distribution in the horizontal direction. In other words, the elliptical shape is a shape without an isotropic intensity distribution.

A description is given below of the optical path of the blue light (hereinafter, referred to also as a blue light path) in the light-source device 20 with the above-described configuration, with reference to FIG. 11A. The blue light path is an optical path of some light rays of the excitation light emitted from the laser source 21, the some light rays to be reflected by the excitation-light reflective region 26E of the phosphor unit 26.

The blue light emitted from the laser source 21 is collimated by the coupling lens 22 to become a collimated light (parallel light). The blue light emitted from the coupling lens 22 is converged and combined by the large-diameter lens 23*a* of the first optical system 23, and then converted into parallel light (collimated light) by the negative lens 23*b*. The blue light emitted from the negative lens 23*b* is reflected by the first region 24A of the dichroic mirror 24 and travels to the second optical system 25. The first region 24A constitutes a reflecting surface 102*a* that reflects the blue light emitted from the laser source 21 (see FIG. 1). The point P at the center of the projection image of the excitation light described above is formed in the first region 24A.

As described above, the first region 24A of the dichroic mirror 24 is disposed closer to the first optical system 23 relative to the optical axis of the second optical system 25. With this arrangement, the blue light path is caused to be incident on a portion of the second optical system 25 (more specifically, the positive lens 25A), the portion being on the first optical system 23 side. Then, the blue light advances so as to approach the optical axis of the second optical system 25 while forming an angle with respect to the optical axis of the second optical system 25, and is emitted from the second optical system 25 (more specifically, from the positive lens 25B). The blue light emitted from the second optical system 25 is incident on the phosphor unit 26.

In the present disclosure, it is assumed that the blue light incident on the phosphor unit 26 has been incident on the excitation-light reflective region 26E. The blue light incident on the excitation-light reflective region 26E is subjected to specular reflection. The blue light specularly reflected by the excitation-light reflective region 26E is then incident on a portion of the second optical system 25 (more specifically, the positive lens 25B), the portion being on the opposite side of the first optical system 23 side with respect to the optical axis of the second optical system 25. Then, the blue light travels away from the optical axis of the second optical system 25 while forming an angle with respect to the optical axis of the second optical system 25, and is emitted from the second optical system 25 (more specifically, the positive lens 25A).

Blue light emitted from the second optical system 25 (more specifically, the positive lens 25A) passes through the second region 24B of the dichroic mirror 24. The light flux of the blue light specularly reflected by the phosphor unit 26 or the light flux of the blue light emitted from the second optical system 25 and transmitted through the second region 24B of the dichroic mirror 24 constitutes the above-described light flux Q of the excitation light emitted from the phosphor unit 103. As described above, the second region 24B of the dichroic mirror 24 has an optical property that transmits the excitation light (and the fluorescence). With this configuration, a decrease in the utilization efficiency of light is substantially prevented even when the light flux (light flux Q) of the blue light intersects with the dichroic mirror 24.

The blue light transmitted through the second region 24B of the dichroic mirror 24 is incident on the refractive optical system 27. Then, the blue light advances so as to approach the optical axis of the refractive optical system 27 while forming an angle with respect to the optical axis of the refractive optical system 27, and is incident on the light tunnel 29 through the color wheel 28. The blue light incident on the light tunnel 29 is reflected plural times thereinside and homogenized (made uniform), and is then incident upon the illumination optical system 30 outside the light-source device 20.

Next, the optical path of the fluorescence (hereinafter, appropriately referred to as a fluorescence light path) in the light-source device 20 is described according to the present embodiment with reference to FIG. 11B. In FIG. 11B, a part of the optical path of the fluorescence is omitted for convenience of explanation. The fluorescence light path is an optical path of some other light rays of the excitation light emitted from the laser source 21, the wavelength of the some other light rays to be converted by the fluorescent region 26D of the phosphor unit 26.

Until the blue light emitted from the laser source 21 is guided to the phosphor unit 26, the fluorescence light path is identical with the blue light path described above. In this case, it is assumed that the blue light incident on the phosphor unit 26 is incident on the fluorescent region 26D. The blue light incident on the fluorescent region 26D serves as excitation light and acts on the phosphor. The phosphor causes the conversion of the wavelength so that the fluorescence including, for example, a yellow wavelength band is generated and the fluorescence is reflected by the reflection coat 26D1 and the phosphor layer 26D2 to exhibit Lambertian reflectance.

The fluorescence Lambertian-reflected by the fluorescent region 26D is converted by the second optical system 25 into parallel light. The fluorescence emitted from the second optical system 25 passes through the dichroic mirror 24 and is incident on the refractive optical system 27. Then, the fluorescence advances so as to approach the optical axis of the refractive optical system 27 while forming an angle with respect to the optical axis of the refractive optical system 27, and is incident on the light tunnel 29 through the color wheel 28. The fluorescence incident on the light tunnel 29 is reflected plural times thereinside and homogenized (made uniform), and is then incident upon the illumination optical system 30 outside the light-source device 20.

As described above, in the light-source device 20 according to the first embodiment, the optical path of the blue light emitted from the laser source 21 differs between before and after the reflection by the phosphor unit 26. More specifically, the blue light path is formed so as to prevent the center (point P in FIG. 1A) of the projection image of the blue light projected from the laser source 21 onto the first region 24A of the dichroic mirror 24, from intersecting with the light flux (light flux Q in FIG. 1A) of the blue light reflected from the phosphor unit 26. With this configuration, the light flux of the blue light emitted from the phosphor unit 26 does not intersect with the center of the projection image of the blue light emitted from the laser source 21. This prevents these blue light beams from passing through the same location on the dichroic mirror 24, which further prevents damage on the dichroic mirror 24 due to an increase in the light condensing density. Thus, the reliability can be increased.

Further, in the present embodiment, particular optical elements such as a phase-contrast plate and a polarization splitter (polarization beam splitter) are not used to separate the optical path of the blue light emitted from the phosphor unit 26, from the other optical path. This configuration reduces the number of components and the cost for producing the light-source device 20, thus achieving a reduction in the size of the light-source device 20. Further, since optical components such as a phase-contrast plate and a polarization splitter are not used to operate the polarization of light, a decrease in the utilization efficiency of light due to the reflectivity, transparency, and absorptance of the optical components can be substantially prevented.

Further, in the light-source device 20 according to the first embodiment, the blue light emitted from the laser source 21 is a linearly polarized laser beam whose polarization direction is a specific direction. In light source unit, a plurality of laser sources 21 is arranged so that all the linearly polarized laser beams are oriented in the same direction. With such an arrangement, the directions of the linearly polarized laser beams emitted from the light source unit are made uniform. The direction of each linearly polarized laser beam is determined by the direction in which the light source unit is arranged. As illustrated in FIGS. 16A and 16B, if the light source unit is tilted according to the tilt of the light tunnel 29, the direction of each linearly polarized laser beam varies. In such a situation where the direction of the linearly polarized laser beams varies, if the polarization of light is controlled by using, for example, a polarization splitter, the utilization efficiency of light might decrease when the light passes through the polarization splitter. Since the polarization of light is not controlled in the light-source device 20 according to the first embodiment, the decrease in the utilization efficiency of light due to the tilt of the laser source 21 can be prevented.

Figure 17A:
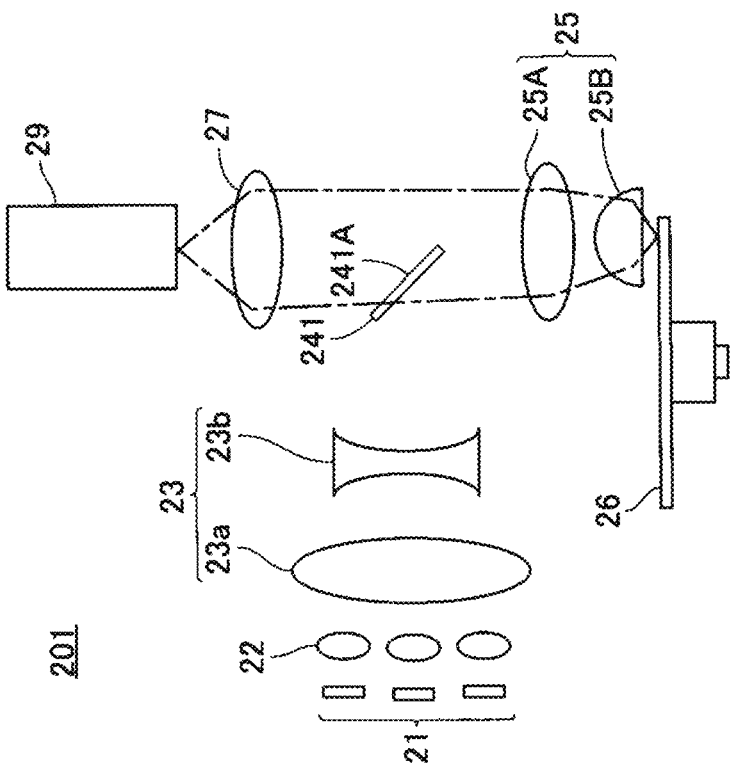
FIGS. 17A and 17B are schematic views of a configuration of a light-source device according to a second embodiment.
Figure 17B:
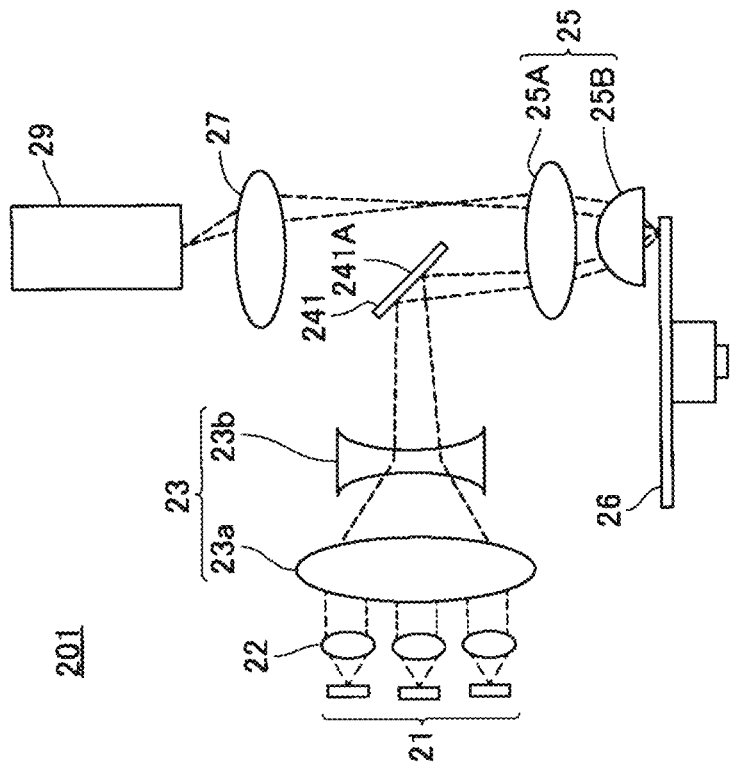

A light-source device 201 according to a second embodiment differs in the configuration of the dichroic mirror from the light-source device 20 according to the first embodiment. Hereinafter, the configuration of the light-source device 201 according to the second embodiment is described below, focusing on differences from the light-source device 20 according to the first embodiment. FIGS. 17A and 17B are schematic views of a light-source device 201 according to the second embodiment. FIG. 17A indicates the optical path of the blue light in the light-source device 201, and FIG. 17B indicates the optical path of the fluorescence in the light-source device 201. In FIGS. 17A and 17B, the same reference numerals are given to the same components as those in FIGS. 11A and 11B, and the description thereof will be omitted. In FIG. 17B, a part of the optical path of the fluorescence is omitted for convenience of explanation.

As illustrated in FIGS. 17A and 17B, the light-source device 201 differs from the light-source device 20 according to the first embodiment in that the light-source device 201 includes a dichroic mirror 241. The dichroic mirror 241 is arranged to be tilted in the same manner as in the dichroic mirror 24. However, the dichroic mirror 241 has a shorter length than the dichroic mirror 24. Since the dichroic mirror 241 is configured to have a shorter length, the size of the light-source device 201 can be reduced. The dichroic mirror 241 has the same optical property for a part of the dichroic mirror 24 (the first region 24A).

Figure 18:
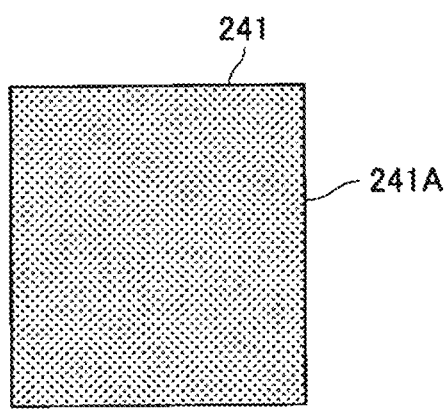
FIG. 18 is an illustration of an example of a configuration of a dichroic mirror in the light-source device according to the second embodiment.

FIG. 18 is an illustration of an example of the dichroic mirror 241 in the light-source device 201 according to the second embodiment. FIG. 18 indicates the dichroic mirror 241 as viewed from the incident direction of the blue light (excitation light) emitted from the first optical system 23 side. As illustrated in FIG. 18, the dichroic mirror 241 has only a region 241A.

Same as the first region 24A, the region 241A has the optical property that reflects the blue light emitted from the first optical system 23 (the negative lens 23b) while transmitting the fluorescence converted from the blue light by the phosphor of the phosphor unit 26. The region 241A is located at the same position as the first region 24A. In other words, the region 241A is disposed on the optical axis of the first optical system 23, but is not disposed on the optical axis of the second optical system 25. The region 241A is disposed closer to the first optical system 23 side relative to the optical axis of the second optical system 25.

A description is given below of the blue light path and the fluorescence light path in the light-source device 201 with the above-described configuration, with reference to FIG. 17A and FIG. 17B. As illustrated in FIG. 17A, the blue light emitted from the laser source 21 is reflected by the excitation-light reflective region 26E of the phosphor unit 26 and emitted to the second optical system 25, which is the same as in the blue light path according to the first embodiment. In the light-source device 201 according to the second embodiment, unlike the first embodiment, the blue light emitted from the second optical system 25 does not pass through the dichroic mirror 241. The light flux (light flux Q) of the blue light emitted from the phosphor unit 26 does not intersect with the dichroic mirror 241. The fluorescence light path is the same as in the first embodiment, as illustrated in FIG. 17B.

In the light-source device 201 according to the second embodiment, the optical path of the blue light emitted from the laser source 21 differs between before and after the reflection by the phosphor unit 26. Accordingly, same as the light-source device 20 according to the first embodiment, the configuration according to the second embodiment exhibits good reliability and achieves a reduction in size and cost.

Particularly, in the light-source device 201, the width of the dichroic mirror 241 can be smaller than the width of the second optical system 25. Accordingly, the size of the light-source device 201 can be reduced. Further, in the light-source device 201, the optical path of the blue light reflected by the phosphor unit 26 does not pass through the dichroic mirror 241. Accordingly, a decrease in the utilization efficiency of light due to the transparency of the dichroic mirror 241 can be substantially prevented.

A light-source device 202 according to a third embodiment differs from the light-source device 201 according to the second embodiment in the following points: 1) the light-source device 202 further includes another light source unit (hereinafter, referred to as a second light source unit) including a laser source 211 and coupling lenses 221, in addition to the light source unit (hereinafter, referred to as a first light source unit where appropriate) including the laser source 21 and the coupling lenses 22; and 2) the light-source device 202 further includes a polarization optical component that combines excitation light emitted from the second light source unit with the excitation light emitted from the first light source unit.

Figure 19A:
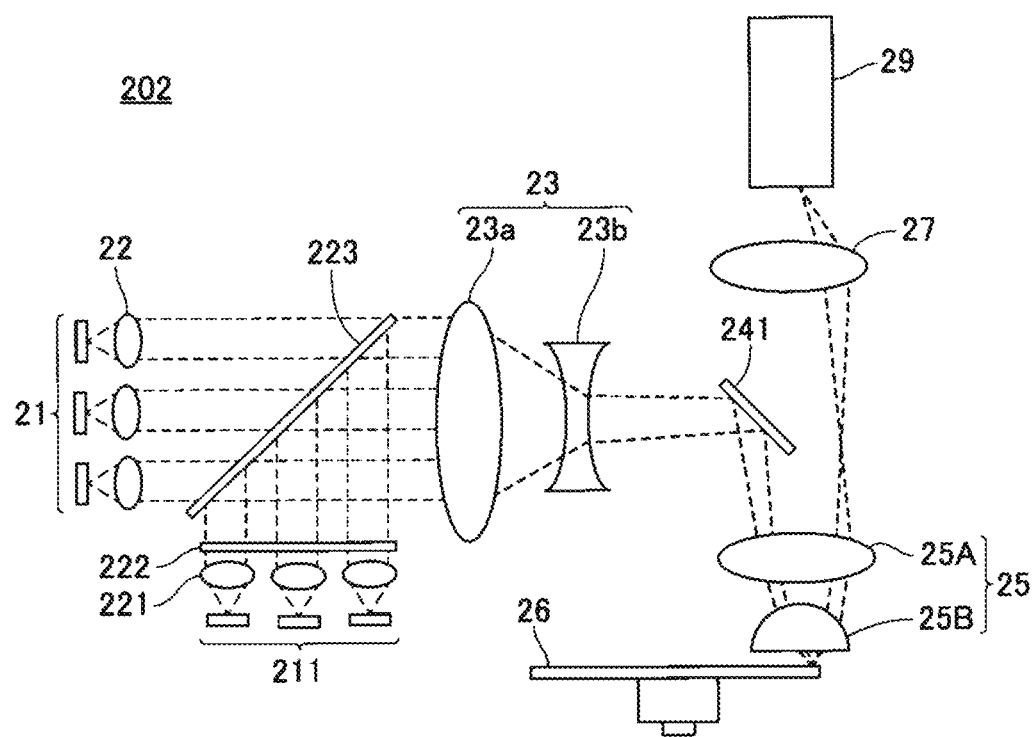
FIGS. 19A and 19B are schematic views of a light-source device according to a third embodiment.
Figure 19B:
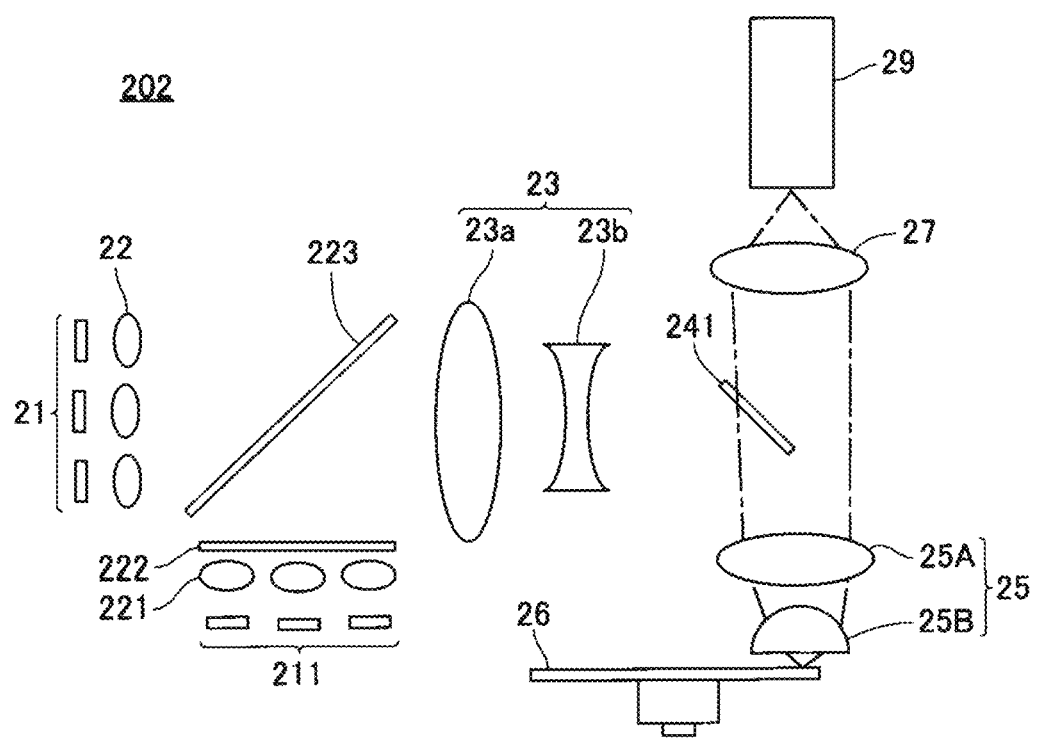

Hereinafter, the configuration of the light-source device 202 according to the third embodiment is described below, focusing on differences from the light-source device 201 according to the second embodiment. FIGS. 19A and 19B are schematic diagrams of the light-source device 202 according to the third embodiment. FIG. 19A indicates the optical path of the blue laser beam in the light-source device 202 according to the third embodiment, and FIG. 19B indicates the optical path of the fluorescence in the light-source device 202 according to the third embodiment. In FIGS. 19A and 19B, the same reference numerals are given to the same components as those in FIGS. 17A and 17B, and the description thereof will be omitted. In FIG. 19B, a part of the optical path of the fluorescence is omitted for convenience of explanation.

As illustrated in FIGS. 19A and 19B, the light-source device 202 includes a laser source 211 and coupling lenses 221, which constitute the second light source unit. The second light source unit is arranged so that the laser beams emitted from the laser source 211 are orthogonal to the laser beams emitted from the laser source 21 of the first light source unit.

The laser source 211 has the same configuration as the laser source 21. In other words, in the laser source 211, light sources (laser diodes) that emit a plurality of laser beams are arranged in array. The laser source 211 emits, for example, blue light in a blue band where the center wavelength of emission intensity is 455 nm. In this case, each of the laser sources 21 and 211 is configured to emit P-polarized light. In a similar manner to the coupling lens 22, the coupling lens 221 is a lens that receives blue light emitted from the laser source 211 and converts the blue light into parallel light (collimated light).

The light-source device 202 includes a half-wave retarder 222 and a polarization splitter 223 that constitute a polarization optical component. The half-wave retarder 222 is arranged to face the plurality of coupling lenses 221. The half-wave retarder 222 converts a P-polarized component of blue light emitted from the laser source 211 into an S-polarized component. The polarization splitter 223 is disposed in the optical path of the blue light emitted from the laser source 21 and the blue light emitted from the laser source 211. The polarization splitter 223 has an optical property that reflects the S-polarized component of the blue light while transmitting the P-polarized component of the blue light.

The P-polarized component of the blue light emitted from the laser source 21 passes through the polarization splitter 223 and is incident on the large-diameter lens 23a of the first optical system 23. After the P-polarized component of the blue light emitted from the laser source 211 is converted into the S-polarized light by the half-wave retarder 222, the S-polarized light is reflected by the polarization splitter 223 and is incident on the large-diameter lens 23a of the first optical system 23. Thus, the excitation light (blue light) from the second light source unit is combined with the excitation light (blue light) from the first light source unit.

The blue light path and the fluorescence light path in the light-source device 202 having such a configuration is described with reference to FIGS. 19A and 19B. As illustrated in FIGS. 19A and 19B, the blue light path and the fluorescence light path after being combined by the polarization splitter 223 and incident on the large-diameter lens 23a of the first optical system 23 are the same as those in the second embodiment.

In the light-source device 202 according to the third embodiment, the optical path of the blue light emitted from the laser source 21 differs between before and after the reflection of the phosphor unit 26. Accordingly, in the same manner as in the light-source device 201 according to the second embodiment, the configuration according to the third embodiment exhibits good reliability and achieves a reduction in size and cost. Particularly, in the light-source device 202, since the excitation light from the second light source unit is combined with the excitation light from the first light source unit, the luminance of the excitation light can be increased, and the utilization efficiency of light can be improved. Further, since the polarization is controlled by the half-wave retarder 222 and the polarization splitter 223 constituting the polarization optical component, the optical paths can be separated from and combined with each other regardless of the presence or absence of the polarization component of the light emitted from the light source.

A light-source device 203 according to a fourth embodiment differs from the light-source device 201 according to the second embodiment in that the light-source device 203 includes a phosphor unit 261 instead of the phosphor unit 26. Hereinafter, the configuration of the light-source device 203 according to the fourth embodiment is described below, focusing on differences from the light-source device 201 according to the second embodiment.

Figure 20A:
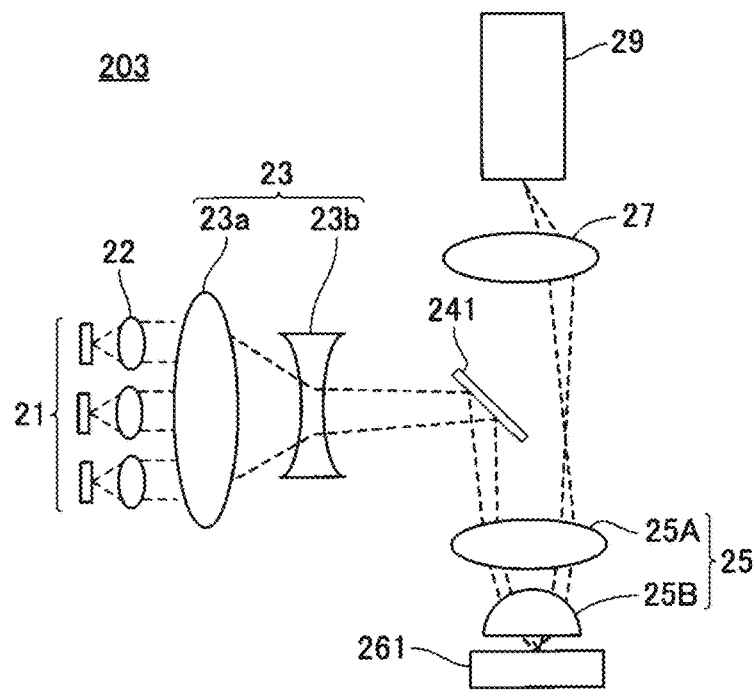
FIGS. 20A and 20B are schematic views of a light-source device according to the fourth embodiment.
Figure 20B:
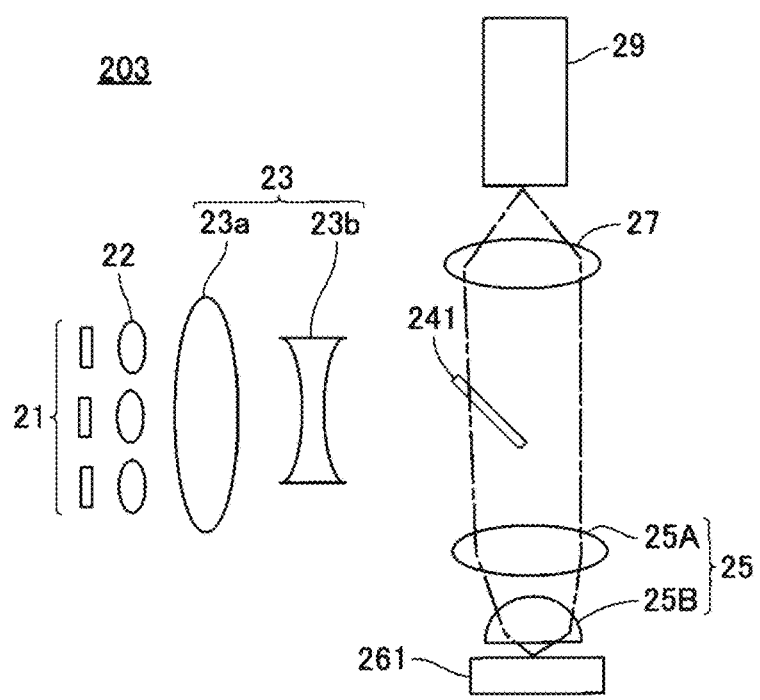

FIGS. 20A and 20B are schematic diagrams of a light-source device 203 according to the fourth embodiment. FIG. 20A indicates the optical path of the blue laser beam in the light-source device 203, and FIG. 20B indicates the optical path of the fluorescence in the light-source device 203. In FIGS. 20A and 20B, the same reference numerals are given to the same components as those in FIGS. 17A and 17B, and description thereof will be omitted. In FIG. 20B, a part of the optical path of the fluorescence is omitted for convenience of explanation.

The light-source device 203 according to the fourth embodiment includes a phosphor unit 261 (hereinafter, referred to as a stationary phosphor unit where appropriate) that is not driven to rotate, instead of the phosphor unit 26 that is driven to rotate. The stationary phosphor unit 261 reflects a portion of the blue light (excitation light) emitted from the laser source 21 with a change from the blue light. The stationary phosphor unit 261 converts the other portions of the blue light into fluorescence and emit the fluorescence.

Figure 21:
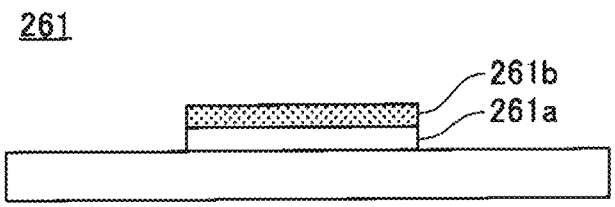
FIG. 21 is a schematic diagram of a phosphor unit in a light-source device according to a fourth embodiment.

FIG. 21 is a schematic diagram of the stationary phosphor unit 261 in the light-source device 203 according to the fourth embodiment. In FIG. 21, the stationary phosphor unit 261 is viewed from a direction orthogonal to the incident direction of the blue light. As illustrated in FIG. 21, the stationary phosphor unit 261 is configured by stacking a phosphor 261b as the wavelength conversion member on a reflection member 261a that reflects excitation light. For example, the reflection member 261a and the phosphor 261b have a rectangular shape in plan view. The phosphor 261b is applied on the reflection member 261a.

The phosphor 261b converts, for example, 80% of the incident blue light (excitation light) into fluorescence. Once the blue light is incident on the stationary phosphor unit 261, 80% of the blue light acts as excitation light for the phosphor 261b, and the phosphor 261b causes the conversion of the wavelength. As a result, the fluorescence including, for example, a yellow wavelength band where the center wavelength of emission intensity is 550 nm is generated, and the fluorescence is Lambertian-reflected by the phosphor 261b and the reflection member 261a.

Of the incident blue light (excitation light), for example, 20% of the blue light does not act as the excitation light and is reflected by the reflection member 261a. As a result, once the blue light is incident on the stationary phosphor unit 261, the blue light and the fluorescence are emitted from the stationary phosphor unit 261 simultaneously.

The blue light path and the fluorescence light path in the light-source device 203 having such a configuration is described with reference to FIGS. 20A and 20B. As illustrated in FIGS. 20A and 20B, the blue light path and the fluorescence light path in the light-source device 203 are the same as those in the second embodiment except for the wavelength conversion and reflection in the stationary phosphor unit 261.

In the light-source device 203 according to the fourth embodiment, the optical path of the blue light emitted from the laser source 21 differs between before and after the reflection of the phosphor unit 261. Accordingly, in the same manner as in the light-source device 201 according to the second embodiment, the configuration according to the fourth embodiment exhibits good reliability and achieves a reduction in size and cost. Particularly, in the light-source device 203, since the blue light and the fluorescence are emitted simultaneously by the stationary phosphor unit 261, there is no need to drive the phosphor unit to rotate, and the manufacturing cost of the device can be reduced. In addition, since the motor for rotational driving is not used, noise can be reduced and a decrease in reliability due to the life of the motor is prevented.

A light-source device 204 according to a fifth embodiment differs from the light-source device 201 according to the second embodiment in including a mirror instead of the dichroic mirror 241 and also in the arrangement of the elements disposed downstream of the first optical system 23. Hereinafter, the configuration of the light-source device 204 according to the fifth embodiment is described below, focusing on differences from the light-source device 201 according to the second embodiment.

Figure 22A:
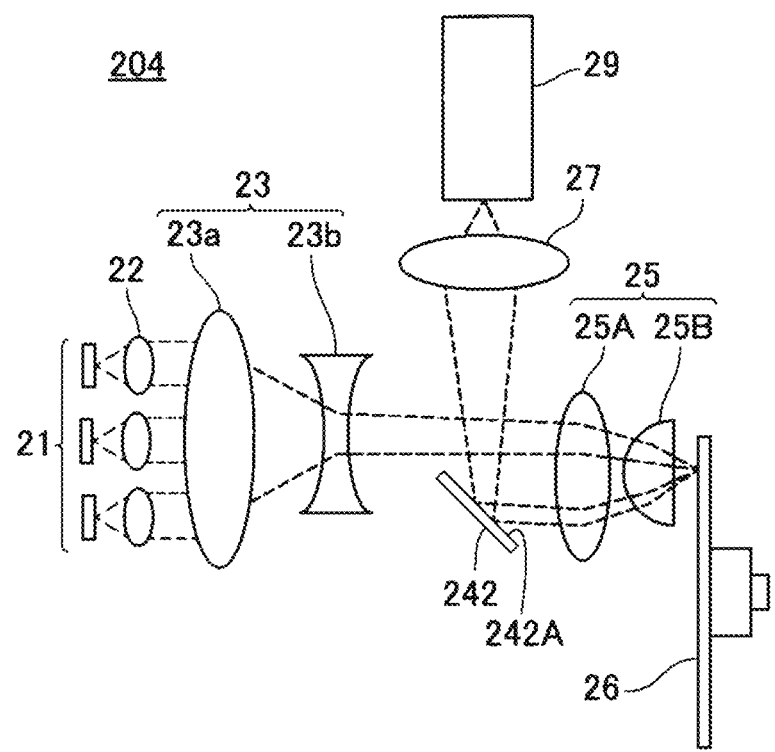
FIGS. 22A and 22B are schematic diagrams of a light-source device according to a fifth embodiment.
Figure 22B:
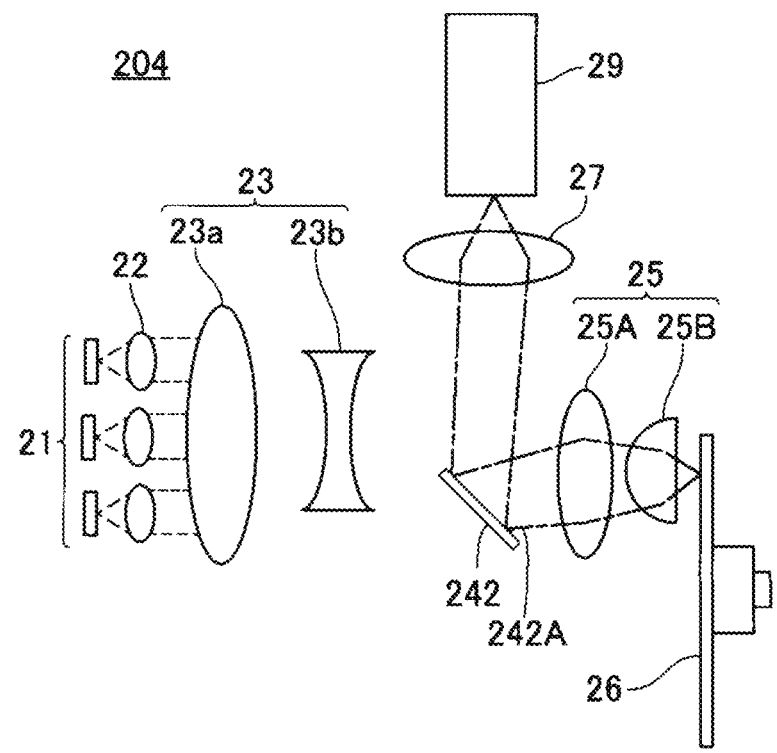

FIGS. 22A and 22B are schematic diagrams of the light-source device 204 according to the fifth embodiment. FIG. 22A indicates the optical path of the blue laser beam in the light-source device 204, and FIG. 22B indicates the optical path of the fluorescence in the light-source device 204. In FIGS. 22A and 22B, the same reference numerals are given to the same components as those in FIGS. 17A and 17B, and description thereof will be omitted. In FIG. 22B, a part of the optical path of the fluorescence is omitted for convenience of explanation.

As illustrated in FIG. 22A, the light-source device 204 includes a laser source (excitation light source) 21, a coupling lens 22, a first optical system 23, a second optical system 25, a phosphor unit 26, a mirror 242, a refractive optical system 27, a color wheel 28, and a light tunnel 29, which are sequentially arranged in the light propagation direction. In FIGS. 22A and 22B, the color wheel 28 is omitted for convenience of description. The color wheel 28 is described with reference to FIG. 10.

The mirror 242 is arranged to be tilted with respect to the propagation direction of the blue light emitted from the second optical system 25. More specifically, the mirror 242 is disposed with the front end portion tilted upward with respect to the propagation direction of the blue light emitted from the second optical system 25. The mirror 242 has an optical property that is capable of reflecting the blue light substantially collimated by the second optical system 25 while transmitting the fluorescence converted by the phosphor unit 26. For example, the mirror 242 is provided with a coat having the above-described optical property. The mirror 242 is misaligned from the optical axis of the positive lens 25A constituting the second optical system 25. The mirror 242 has a reflecting surface 242A on the surface facing the positive lens 25A.

The blue light path in the light-source device 204 having such a configuration is described with reference to FIG. 22A. The blue light path is an optical path of some light rays of the excitation light emitted from the laser source 21, the some light rays to be reflected by the excitation-light reflective region 26E of the phosphor unit 26.

The blue light emitted from the laser source 21 is converted by the coupling lens 22 into parallel light. The blue light emitted from the coupling lens 22 is converged and combined by the large-diameter lens 23a of the first optical system 23, and then converted into parallel light (collimated light) by the negative lens 23b. The blue light emitted from the negative lens 23b is caused to be incident on a portion of the second optical system 25 (more specifically, the positive lens 25A), the portion being on the refractive optical system 27 side (the upper side in FIGS. 22A and 22B). Then, the blue light advances so as to approach the optical axis of the second optical system 25 while forming an angle with respect to the optical axis of the second optical system 25, and is emitted from the second optical system 25 (more specifically, from the positive lens 25B). The blue light emitted from the second optical system 25 is incident on the phosphor unit 26.

In the present disclosure, it is assumed that the blue light incident on the phosphor unit 26 has been incident on the excitation-light reflective region 26E. The blue light incident on the excitation-light reflective region 26E is subjected to specular reflection. The blue light specularly reflected by the excitation-light reflective region 26E is then incident on a portion of the second optical system 25 (more specifically, the positive lens 25B), the portion being on the opposite side (the lower side in FIGS. 22A and 22B) of the refractive optical system 27 side. Then, the blue light travels away from the optical axis of the second optical system 25 while forming an angle with respect to the optical axis of the second optical system 25, and is emitted from the second optical system 25 (more specifically, the positive lens 25A).

The blue light emitted from the second optical system 25 (more specifically, the positive lens 25A) is reflected by the reflecting surface 242A of the mirror 242 and is incident on the refractive optical system 27. Then, the blue light advances so as to approach the optical axis of the refractive optical system 27 while forming an angle with respect to the optical axis of the refractive optical system 27, and is incident on the light tunnel 29 through the color wheel 28. The fluorescence incident on the light tunnel 29 is reflected plural times thereinside and homogenized (made uniform), and is then incident upon the illumination optical system 30 outside the light-source device 20.

Next, the optical path of the fluorescence in the light-source device 204 is described according to the present embodiment with reference to FIG. 22B. The fluorescence light path is an optical path of some other light rays of the excitation light emitted from the laser source 21, the wavelength of the some other light rays to be converted by the fluorescent region 26D of the phosphor unit 26.

Until the blue light emitted from the laser source 21 is guided to the phosphor unit 26, the fluorescence light path is identical with the blue light path described above. In this case, it is assumed that the blue light incident on the phosphor unit 26 is incident on the fluorescent region 26D. The blue light incident on the fluorescent region 26D serves as excitation light and acts on the phosphor. The phosphor causes the conversion of the wavelength so that the fluorescence including, for example, a yellow wavelength band is generated and the fluorescence is reflected by the reflection coat 26D1 and the phosphor layer 26D2 to thus exhibit Lambertian reflectance.

The fluorescence Lambertian-reflected by the fluorescent region 26D is converted by the second optical system 25 into parallel light. The fluorescence emitted from the second optical system 25 is reflected by the reflecting surface 242A of the mirror 242 and is incident on the refractive optical system 27. Then, the fluorescence advances so as to approach the optical axis of the refractive optical system 27 while forming an angle with respect to the optical axis of the refractive optical system 27, and is incident on the light tunnel 29 through the color wheel 28. The fluorescence incident on the light tunnel 29 is reflected plural times thereinside and homogenized (made uniform), and is then incident upon the illumination optical system 30 outside the light-source device 20.

In the light-source device 204 according to the fifth embodiment, the optical path of the blue light emitted from the laser source 21 differs between before and after the reflection of the phosphor unit 26. Accordingly, in the same manner as in the light-source device 20 according to the first embodiment, the configuration according to the fifth embodiment exhibits good reliability and achieves a reduction in size and cost.

A light-source device 205 according to a sixth embodiment differs from the light-source device 204 according to the fifth embodiment in including a dichroic mirror in addition to the mirror 242. Hereinafter, the configuration of the light-source device 205 according to the sixth embodiment is described below, focusing on differences from the light-source device 204 according to the fifth embodiment.

Figure 23A:
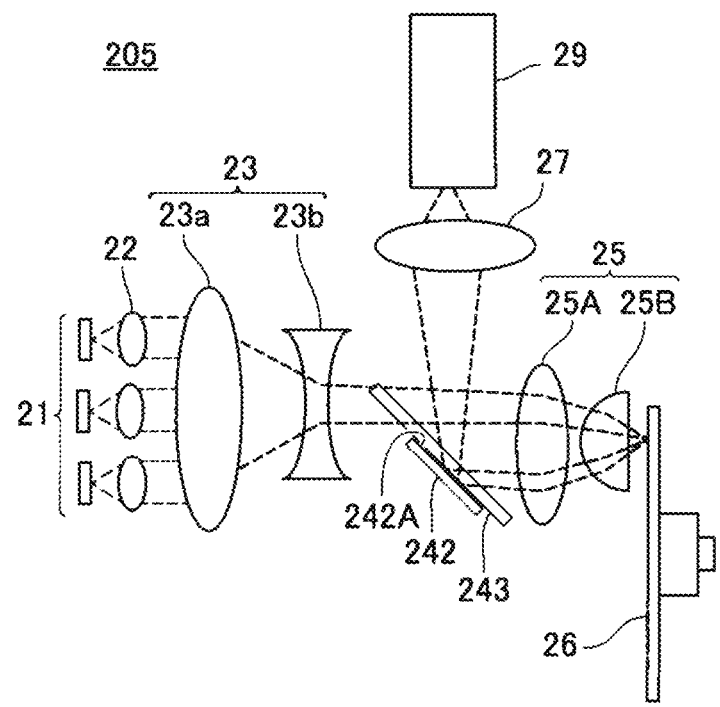
FIGS. 23A and 23B are schematic diagram of a light-source device according to a sixth embodiment.
Figure 23B:
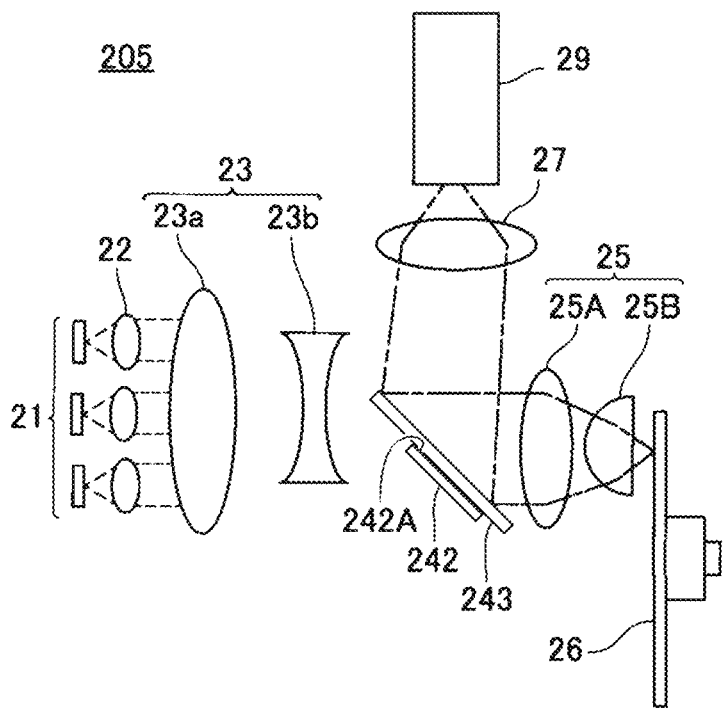

FIGS. 23A and 23B are schematic diagrams of a light-source device 205 according to a sixth embodiment. FIG. 23A indicates the optical path of the blue laser beam in the light-source device 205, and FIG. 23B indicates the optical path of the fluorescence in the light-source device 205. In FIGS. 23A and 23B, the same reference numerals are given to the same components as those in FIGS. 22A and 22BA, and description thereof will be omitted. In FIG. 23B, a part of the optical path of the fluorescence is omitted for convenience of explanation.

As illustrated in FIG. 23A, the light-source device 205 has a dichroic mirror 243 near the mirror 242. The dichroic mirror 243 has an optical property that is capable of reflecting the blue light substantially collimated by the first optical system while transmitting the fluorescence converted by the phosphor unit 26. For example, the dichroic mirror 243 is provided with a coat having the above-described optical property. The dichroic mirror 243 is disposed on the reflecting surface 242A side, in parallel with the mirror 242. In other words, in the same manner as the mirror 242, the dichroic mirror 243 is arranged obliquely with respect to the propagation direction of the blue light emitted from the second optical system 25. Preferably, the dichroic mirror 243 is disposed on the optical axis of second optical system 25. More preferably, the dichroic mirror 243 is disposed on the optical axis of the second optical system 25 and also on the optical axis of the refractive optical system 27.

The blue light path in the light-source device 205 having such a configuration is described with reference to FIG. 23A. The light-source device 205 according to the sixth embodiment differs from the light-source device 204 according to the fifth embodiment only in that the blue light beam emitted from the second optical system 25 is transmitted through the dichroic mirror 243 before being reflected by the reflecting surface 242A of the mirror 242 in the blue light path in the light-source device 205. For this reasons, description of the above-described functional units are omitted.

Next, the optical path of the fluorescence in the light-source device 205 is described according to the present embodiment with reference to FIG. 23B. After the blue light emitted from the laser source 21 is converted into the fluorescent light and then converted into the parallel light by the second optical system 25, the fluorescent light path is the same as the light-source device 204 according to the fifth embodiment. is there. In the light-source device 205, the fluorescence emitted from the second optical system 25 is reflected not by the mirror 242 but by the dichroic mirror 243, and is incident on the refractive optical system 27. Then, the fluorescence advances so as to approach the optical axis of the refractive optical system 27 while forming an angle with respect to the optical axis of the refractive optical system 27, and is incident on the light tunnel 29 through the color wheel 28. The fluorescence incident on the light tunnel 29 is reflected plural times thereinside and homogenized (made uniform), and is then incident upon the illumination optical system 30 outside the light-source device 20.

In the light-source device 205 according to the sixth embodiment, the optical path of the blue light emitted from the laser source 21 differs between before and after the reflection of the phosphor unit 26. Accordingly, in the same manner as in the light-source device 20 according to the first embodiment, the configuration according to the fifth embodiment exhibits good reliability and achieves a reduction in size and cost. Particular, in the light-source device 205, the dichroic mirror 243 is disposed on the optical axis of the second optical system 25 and also on the optical axis of the refractive optical system 27. This can improve the utilization efficiency of the fluorescence light.

A light-source device 206 according to a seventh embodiment differs from the light-source device 205 according to the sixth embodiment in the following points: 1) the light-source device 206 further includes another light source unit (the second light source unit) including a laser source 211 and coupling lenses 221, in addition to the light source unit (the first light source unit) including the laser source 21 and the coupling lenses 22; and 2) the light-source device 206 further includes a polarization optical component that combines excitation light emitted from the second light source unit with the excitation light emitted from the first light source unit. Hereinafter, the configuration of the light-source device 206 according to the seventh embodiment is described below, focusing on differences from the light-source device 205 according to the sixth embodiment.

Figure 24A:
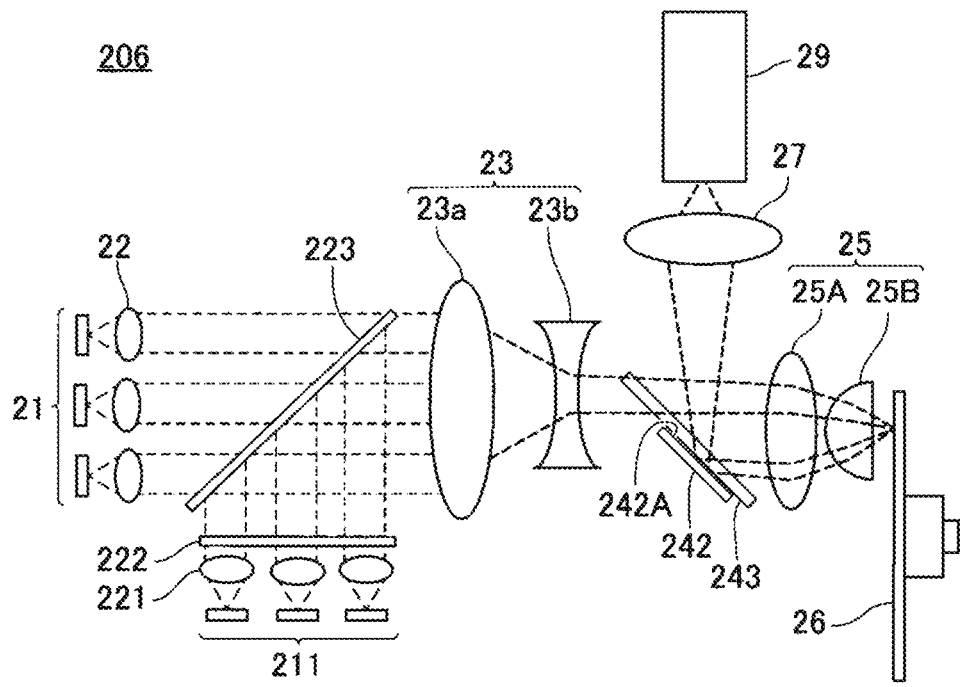
FIGS. 24A and 24B are schematic diagrams of a light-source device according to a seventh embodiment of the present disclosure.
Figure 24B:
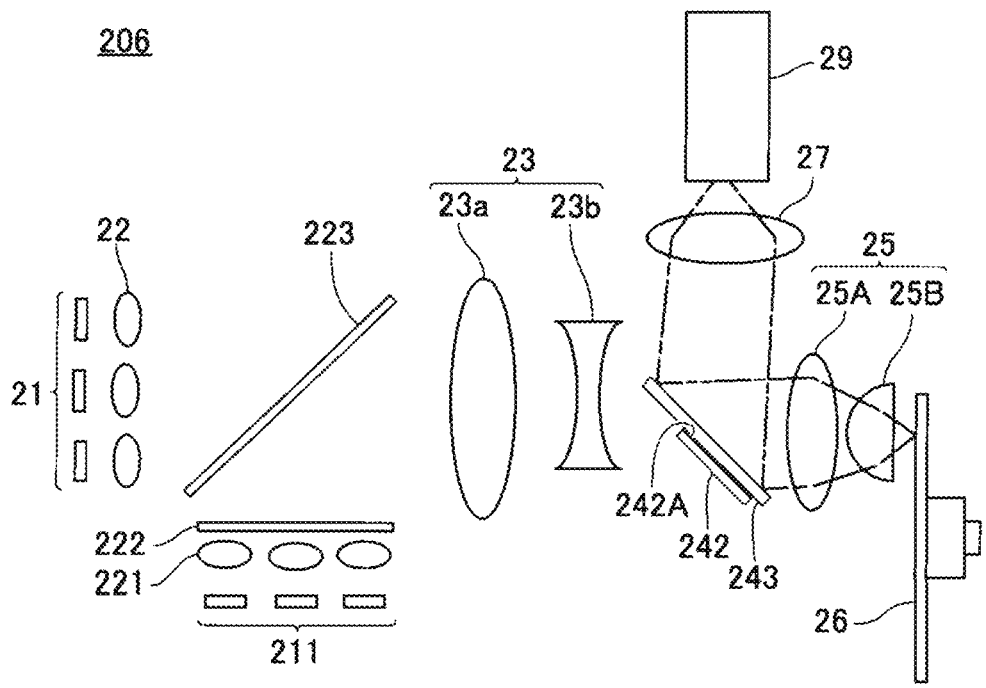

FIGS. 24A and 24B are schematic diagrams of the light-source device 206 according to the seventh embodiment. FIG. 24A indicates the optical path of the blue laser beam in the light-source device 206, and FIG. 24B indicates the optical path of the fluorescence in the light-source device 206. In FIGS. 24A and 24B, the same reference numerals are given to the same components as those in FIGS. 19A and 19B and FIGS. 23A and 23B, and description thereof will be omitted. In FIG. 24B, a part of the optical path of the fluorescence is omitted for convenience of explanation.

As illustrated in FIG. 24A, the light-source device 206 differs from the light-source device 205 according to the sixth embodiment in that the light-source device 206 includes a laser source 211 and a coupling lenses 221 constituting a second light source unit, and in that the light-source device 206 includes a half-wave retarder 222 and a polarization splitter 223 constituting the polarization optical component. For the configurations of the second light source unit, the half-wave retarder 222, and the polarization splitter 223, refer to the description of the light-source device 202 according to the third embodiment in in FIGS. 19A and 19B.

The blue light path in the light-source device 206 having such a configuration is described with reference to FIG. 24A. As illustrated in FIG. 24A, the blue light path from the laser source 21 and the laser source 211 to the first optical system 23 is the same as that of the light-source device 202 according to the third embodiment (see FIG. 19A). The blue light path from the first optical system 23 to the light tunnel 29 is the same as that of the light-source device 205 according to the sixth embodiment (see FIG. 23A). For this reasons, the description of the above-described functional units are omitted.

Next, the optical path of the fluorescence in the light-source device 206 is described according to the present embodiment with reference to FIG. 24B. In the light-source device 206, the fluorescence light path from the laser source 21 and the laser source 211 to the first optical system 23 is the same as in the light-source device 202 according to the third embodiment. The fluorescence light path from the first optical system 23 to the light tunnel 29 is the same as in the light-source device 205 according to the sixth embodiment (see FIG. 23A). Therefore, a detailed description thereof will be omitted.

In the light-source device 206 according to the seventh embodiment, the optical path of the blue light emitted from the laser source 21 differs between before and after the reflection of the phosphor unit 26. Accordingly, in the same manner as in the light-source device 20 according to the first embodiment, the configuration according to the first embodiment exhibits good reliability and achieves a reduction in size and cost. Particularly, in the light-source device 206, since the excitation light from the second light source unit is combined with the excitation light from the first light source unit, the luminance of the excitation light can be increased, and the utilization efficiency of light can be improved. Further, since the polarization is controlled by the half-wave retarder 222 and the polarization splitter 223 constituting the polarization optical component, the optical paths can be separated from and combined with each other regardless of the presence or absence of the polarization component of the light emitted from the light source.

A light-source device 207 according to an eight embodiment differs from the light-source device 204 according to the fifth embodiment in that the light-source device 207 includes a phosphor unit (stationary phosphor unit) that is not driven to rotate, instead of the phosphor unit 26 that is driven to rotates. Hereinafter, the configuration of the light-source device 207 according to the eighth embodiment is described below, focusing on differences from the light-source device 204 according to the fifth embodiment.

Figure 25A:
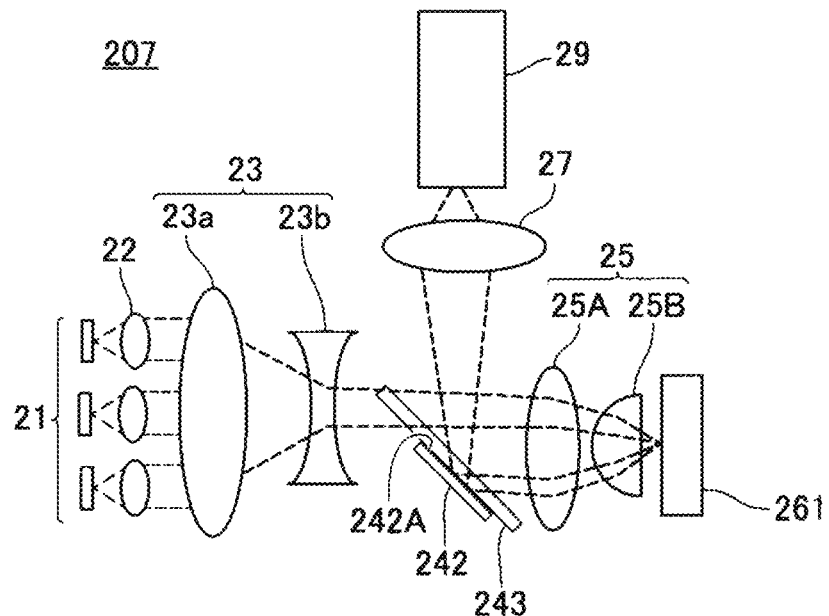
FIGS. 25A and 25B are schematic diagrams of a light-source device according to an eighth embodiment.
Figure 25B:
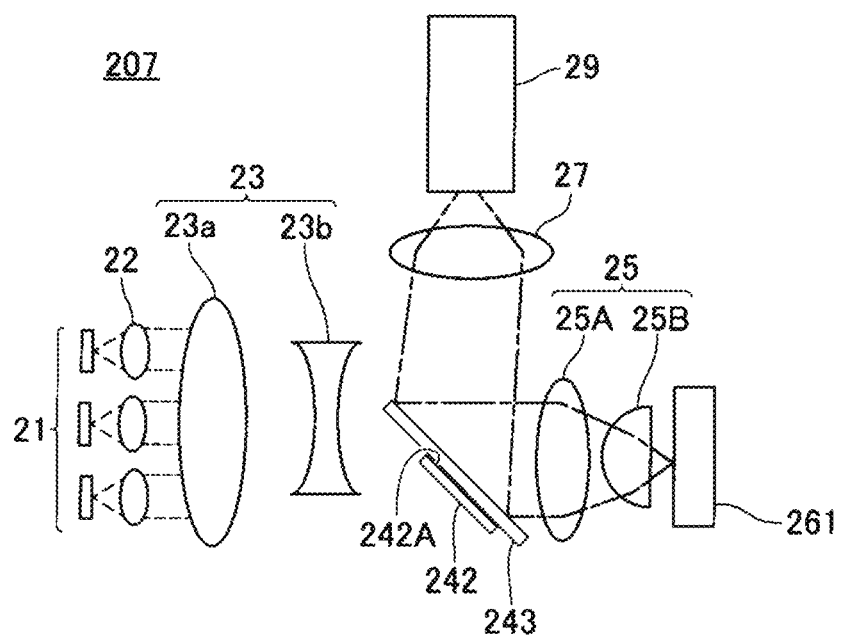

FIGS. 25A and 25B are schematic diagrams of a light-source device 207 according to the eighth embodiment. FIG. 25A illustrates the optical path of the blue laser beam in the light-source device 207, and FIG. 25B illustrates the optical path of the fluorescence light in the light-source device 207. In FIGS. 25A and 25, the same reference numerals are given to the same components as those in FIGS. 20A and 20B and FIGS. 23A and 23B, and description thereof will be omitted. In FIG. 24B, a part of the optical path of the fluorescence is omitted for convenience of explanation.

As illustrated in FIG. 25A, the light-source device 207 according to the eighth embodiment differs from the light-source device 204 according to the fifth embodiment in that the light-source device 207 includes a phosphor unit (stationary phosphor unit) 261 that is not driven to rotate, instead of the phosphor unit 26 that is driven to rotate. For the configurations of the stationary phosphor unit 261, refer to the description of the light-source device 203 according to the fourth embodiment in in FIGS. 20A and 20B.

The blue light path in the light-source device 207 having such a configuration is described with reference to FIG. 25A. As illustrated in FIG. 25A, the blue light path from the laser source 21 to the stationary phosphor unit 261 is the same as that of the light-source device 205 according to the sixth embodiment. The blue light path from the stationary phosphor unit 261 to the light tunnel 29 is the same as that of the light-source device 205 according to the sixth embodiment. Therefore, a detailed description thereof will be omitted.

Next, the optical path of the fluorescence in the light-source device 207 is described according to the present embodiment with reference to FIG. 24B. The blue light path from the laser source 21 to the stationary phosphor unit 261 in the light-source device 207 is the same as that of the light-source device 205 according to the sixth embodiment. The fluorescence light path from the stationary phosphor unit 261 to the light tunnel 29 is the same as that of the light-source device 205 according to the sixth embodiment. Therefore, a detailed description thereof will be omitted.

In the light-source device 207 according to the eighth embodiment, the optical path of the blue light emitted from the laser source 21 differs between before and after the reflection of the phosphor unit 261. Accordingly, in the same manner as in the light-source device 20 according to the first embodiment, the configuration according to the eighth embodiment exhibits good reliability and achieves a reduction in size and cost. Particularly, in the light-source device 207, since the blue light and the fluorescence are emitted simultaneously by the stationary phosphor unit 261, there is no need to drive the phosphor unit to rotate, and the manufacturing cost of the device can be reduced. In addition, since the motor for rotational driving is not used, noise can be reduced and a decrease in reliability due to the life of the motor is prevented.

While specific examples desirable for the present disclosure are described in the above-described embodiments; however, the disclosure is not limited to the contents. In particular, the specific shapes and numerical values of the respective components exemplified in the embodiments are merely examples for implementing the disclosure. The technical scope of the disclosure should not be limitedly interpreted thereby. The present disclosure is not limited to the contents described in the embodiments, and may be properly modified within the scope of the disclosure.

The advantageous effects of the present invention are achieved by the following aspects:

In a first aspect, a light-source device (100) includes an excitation light source (101) configured to emit first colored light; an optical element (102) having a reflecting surface to reflect the first colored light emitted from the excitation light source (101); and a wavelength conversion unit (103) configured to emit the first colored light reflected by the optical element (102). The wavelength conversion unit (103) includes a wavelength conversion member (26D2) configured to convert at least a portion of the first colored light reflected by the optical element (102) and incident on the wavelength conversion unit (103), into second colored light having a wavelength different from a wavelength of the first colored light and emit the second colored light. A point P does not intersect with a light flux Q where the point P is a center of the first colored light on the reflecting surface of the optical element (102) and the light flux Q is a light flux of the first colored light emitted from the wavelength conversion unit (103).

As a second aspect, in the light-source device (100) according to the first aspect, the wavelength conversion unit (103) includes: a first area (26E) to reflect or diffuse the first colored light reflected by the optical element (102) to emit the first colored light; and a second area (26D) including the waveform conversion member (26D2), to convert the first colored light reflected by the optical element (102) and incident on the second area (26D) into the second colored light and emit the second colored light. Upon the first colored light being incident on the wavelength conversion unit (103), the wavelength conversion unit (103) is configured to alternately emit the first colored light and the second colored light to an incident-plane side of the wavelength conversion unit (103) that the first colored light has been incident on.

As a third aspect, in the light-source device (100) according to the first aspect, the wavelength conversion unit (103) includes an area to receive the first colored light reflected by the optical element (102) and the area includes the wavelength conversion member (261b). The wavelength conversion member (261b) is configured to convert a portion of the first colored light incident on the area into the second colored light and reflect the other portion of the first colored light. Upon the first colored light being incident on the wavelength conversion unit (103), the wavelength conversion unit (103) is configured to emit the first colored light and the second colored light together to an incident-plane side of the wavelength conversion unit (103) that the first colored light has been incident on.

As a fourth aspect, in the light-source device (100) according to any one of the first aspect to the third aspect, further includes a light mixing device (104) configured to mix at least one of the first colored light and the second colored light emitted from the wavelength conversion unit (103); and a light guide configured to guide the at least one of the first colored light and the second colored light emitted from the wavelength conversion unit (103) to the light mixing device (104).

As a fifth aspect, in the light-source device (100) according to the fourth aspect, when a point R is a center of a projection image of the first colored light projected on the wavelength conversion unit (103), the light mixing device (104) is disposed on the normal to the point R on an exit plane (103a) of the wavelength conversion unit (103).

As a sixth aspect, the light-source device (100) according to any one of the first aspect to the fifth aspect, further includes a focusing element (105) disposed in an optical path between the optical element (102) and the wavelength conversion unit (103), the focusing element (105) configured to converge the first colored light reflected by the optical element (102) and substantially collimate the second colored light emitted from the wavelength conversion unit (103). A position of the point R is different from a position of a point S when the point S is a point of intersection of an incident plane of the wavelength conversion unit (103) that the first colored light converged by the focusing element (105) has been incident on and a straight line (L1) connecting the point P and a center of a projection image on an incident plane of the focusing element (105) that the first colored light reflected by the reflecting surface has been incident on, the projection image being formed by the first colored light.

As a seventh aspect, in the light-source device (100) according to the sixth aspect, wherein the straight line (L1) intersects perpendicularly with the incident plane of the wavelength conversion unit (103) that the first colored light has been incident on.

As an eighth aspect, the light-source device (100) according to the fourth aspect, further includes a refractive optical element (106) configured to guide at least one of the first colored light and the second colored light emitted from the wavelength conversion unit (103) to an incident aperture (104a) of the light mixing element (104), wherein the light mixing device (104) is a rod integrator.

As a ninth aspect, in the light-source device (100) according to the eighth aspect, a center of a projection image of the first colored light projected on the incident aperture (104a) of the rod integrator, a center of a projection image of the second colored light projected on the incident aperture (104a), and the optical axis of the refractive optical element (106) intersect at one point.

As a tenth aspect, in the light-source device (100) according to the eighth aspect to the ninth aspect, a plane including the straight line (L1) and another straight line (L2) is substantially parallel to a short side of the incident aperture (104a) of the rod integrator, said another straight line (L2) being a straight line connecting a center of a projection image of the first colored light on the incident aperture (104a) of the rod integrator and a point R that is a center of a projection image of the first colored light on the wavelength conversion unit (103). As an eleventh aspect, in the light-source device (100) according to any one of the eighth aspect to the tenth aspect, the plane including the straight line (L1) and another straight line (L2) is substantially parallel to a short side of a light-emitting surface of the excitation light source (101), said another straight line (L2) being a straight line connecting a center of a projection image of the first colored light on the incident aperture (104a) of the rod integrator and a point R that is a center of a projection image of the first colored light on the wavelength conversion unit (103).

As a twelfth aspect, in the light-source device (100) according to any one of the eighth aspect to the eleventh aspect, an angle β is smaller than 40° when the angle β is an angle between the incident aperture (104a) of the rod integrator and the incident plane of the first colored light with respect to the incident aperture (104a).

As a thirteenth aspect, in the light-source device (100) according to any one of the eighth aspect to the twelfth aspect, an angle θ1 is smaller than an angle θ2 when the angle θ1 is a maximum incident angle of a light ray of the first colored light with respect to the incident aperture (104a) and the angle θ2 is a maximum incident angle of a light ray of the second colored light with respect to the incident aperture (104a) of the rod integrator.

As a fourteenth aspect, in the light-source device (100) according to any one of the eighth aspect to the twelfth aspect, an angle θ1 is equal to an angle θ2 when the angle θ1 is a maximum incident angle of a light ray of the first colored light with respect to the incident aperture (104a) and the angle θ2 is a maximum incident angle of a light ray of the second colored light with respect to the incident aperture (104a) of the rod integrator.

As a fifteenth aspect, in the light-source device (100) according to any one of the eighth aspect to the fourteenth aspect, the rod integrator has an exit aperture (104b) larger than the incident aperture (104a).

As a sixteenth aspect, in the light-source device (100) according to any one of the eighth aspect to the fifteenth aspect, the rod integrator is a glass rod integrator, and wherein an angle θglass is larger than each of the angle θ1 and the angle θ2 when the angle θglass is a total reflection condition of the glass rod integrator.

As a seventeenth aspect, in the light-source device (100) according to any one of the eighteenth aspect to the sixteenth aspect, the excitation light source (101) includes a plurality of laser diodes arranged in array. A projection range of the first colored light emitted from each of the laser diodes on the incident aperture (104a) of the rod integrator has an elliptical shape whose major axis is substantially parallel to a long side or the short side of the incident aperture (104a) of the rod integrator.

As an eighteenth aspect, the light-source device (100) according to the seventeenth aspect, further includes a light source unit (21, 22) including the plurality of laser diodes. The plurality of laser diodes is disposed on the same substrate in the light source unit (21, 22).

As a nineteenth aspect, the light-source device (100) according to any one of the first aspect to the eighteenth aspect, further includes coupling lenses (22). The light source unit (21, 22) includes the excitation light source (101) and the coupling lenses (22). The excitation light source (101) includes the plurality of laser diodes arranged in rows and columns and each of the coupling lenses (22) is disposed on an exit-plane side of a corresponding one of the plurality of laser diodes. An interval between the laser diodes satisfies Formula below:

$$1 \leq P/L \tan \theta \leq 4$$

where
- θ denotes a divergence angle of the first colored light emitted from each of the plurality of laser diodes, the divergence angle being a larger angle between an angle in a row direction and an angle in a column direction,
- P denotes a pitch between adjacent laser diodes, and
- L denotes a distance from a light-emitting point of each of the plurality of laser diodes to a corresponding one of the coupling lenses.

As a twentieth aspect, in the light-source device (100) according to any one of the first aspect to the nineteenth aspect, The optical element (102) has an optical property to transmit the first colored light and the second colored light, and the optical element (102) is disposed to intersect with the light flux Q.

As a twenty-first aspect, in the light-source device (100) according to any one of the first aspect to the nineteenth aspect, the optical element (102) has an optical property to transmit the first colored light and the second colored light, and the optical element (102) is disposed to not intersect with the light flux Q.

As a twenty-second aspect, in the light-source device (100) according to the twentieth aspect or twenty-first aspect, the reflecting surface of the optical element (102) has an optical property to reflect the first colored light and transmit the second colored light. As a twenty-third aspect, in the light-source device (100) according to any one of the second aspect, the fourth aspect to the twenty-second aspect, the wavelength conversion unit (103) includes: a disk body (26A) whose circular substrate is divided into the first area (26E) and the second area (26D) in a circumferential direction; and a drive unit (26C) configured to be driven to rotate around a rotation axis (26B) that is a straight line passing through a center of the disk body (26A) and perpendicular to a plane of the disk body (26A).

As a twenty-fourth aspect, the light-source device (100) according to any one of the first aspect to the twenty-third aspect, further includes a large-diameter element (23a) having positive power and a collimating element (23b) having negative power, arranged in that order in a direction of travel of the first colored light between the excitation light source (101) and the optical element (102). The first colored light emitted from the excitation light source (101) is converged by the large-diameter element (23a), is substantially collimated by the collimating element (23b), and is incident on the optical element (102).

As a twenty-fifth aspect, an image projection apparatus (1) includes the light-source device (100) according to any one of the first aspect to the twenty-fourth aspect; an image display element (40) to generate an image of light emitted from the light-source device (100); an illumination optical system (30) configured to guide the light emitted from the light-source device (100) to the image display element; and a projection optical system (50) configured to project the image generated by the image display element (40).

As a twenty-sixth aspect, a light source optical system (102, 103) includes an optical element (102) having a reflecting surface to reflect first colored light emitted from an excitation light source; and a wavelength conversion unit (103) configured to emit the first colored light reflected by the optical element (102), the wavelength conversion unit (103) including a waveform conversion member (26D2) configured to convert at least a portion of the first colored light reflected by the optical element (102) and incident on the wavelength conversion unit (103), into second colored light having a wavelength different from a wavelength of the first colored light and emit the second colored light. A point P does not intersect with a light flux Q where the point P is a center of the first colored light on the reflecting surface of the optical element (102) and the light flux Q is a light flux of the first colored light emitted from the wavelength conversion unit (103).

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A light-source device, comprising:
- a source including an excitation light source and a coupling lens, the excitation light source configured to emit first colored light;
- an optical element having a surface to reflect the first colored light emitted from the excitation light source, the surface of the optical element including a first region and a second region;
- a wavelength converter configured to emit the first colored light reflected by the surface, the wavelength converter including a wavelength conversion layer that converts at least a portion of the first colored light reflected by the surface and incident on the wavelength converter, into second colored light having a wavelength different from a wavelength of the first colored light and emit the second colored light;
- a rod integrator configured to mix at least one of the first colored light and the second colored light emitted from the wavelength converter and transmitted by the second region of the optical element; and
- a refractive light guide configured to guide at least one of the first colored light and the second colored light emitted from the wavelength converter to an incident aperture of the rod integrator, wherein
- an angle β, smaller than 40°, is between the incident aperture of the rod integrator and the first colored light with respect to the incident aperture,
- the first region has optical properties to reflect the first colored light and to transmit the second colored light, the second region has optical properties to transmit the first colored light and the second colored light,
a light flux Q is a light flux of the first colored light emitted from the wavelength converter,
a point P is a center of the first colored light on the surface,
the point P does not intersect with the flux Q,
a plane is substantially parallel to a short side of the incident aperture of the rod integrator, the plane including:
  a first straight line that connects the point P to a point S on the wavelength converter, and
  a second straight line that connects a center of a first projection image of the first colored light on the incident aperture of the rod integrator and a point R that is a center of a second projection image of the first colored light on the wavelength converter, the point R being different from the point S,
the excitation light source includes a plurality of laser diodes arranged in rows along a row axis and columns along a column axis in a first plane normal to an optical axis, and each of the coupling lenses is disposed on an exit-plane side of a corresponding one of the plurality of laser diodes,
an interval between the laser diodes satisfies that:

$1 \leq P/L \tan \theta \leq 4$, where $\theta$ is a divergence angle of the first colored light emitted from each of the plurality of laser diodes, the divergence angle being a larger angle between a row angle from the optical axis in a second plane normal to a column axis and a column angle from the optical axis in a third plane normal to the row axis,
P is a pitch between adjacent laser diodes, and
L is a distance from a light-emitting point of each of the plurality of laser diodes to a corresponding one of the coupling lenses.

2. The light-source device according to claim 1, wherein the wavelength converter includes:
  a first area to reflect or diffuse the first colored light reflected by the surface to emit the first colored light; and
  a second area including the wavelength conversion layer, to convert the first colored light reflected by the surface and incident on the second area into the second colored light and emit the second colored light, and
upon the first colored light being incident on the wavelength converter, the wavelength converter is configured to alternately emit the first colored light and the second colored light to an incident-plane side of the wavelength converter that the first colored light has been incident on.

3. The light-source device according to claim 1, wherein the wavelength converter includes an area to receive the first colored light reflected by the surface and the area includes the wavelength conversion layer,
the wavelength conversion layer is configured to convert a portion of the first colored light incident on the area into the second colored light and reflect the other portion of the first colored light, and
upon the first colored light being incident on the wavelength converter, the wavelength converter is configured to emit the first colored light and the second colored light together to an incident-plane side of the wavelength converter that the first colored light has been incident on.

4. The light-source device according to claim 1, wherein in a case that the point R is a center of a projection image of the first colored light projected on the wavelength converter, the light mixing device is disposed on the normal to the point R on an exit plane of the wavelength converter.

5. The light-source device according to claim 1, wherein a center of a projection image of the first colored light projected on the incident aperture of the rod integrator, a center of a projection image of the second colored light projected on the incident aperture, and an optical axis of the refractive light guide intersect at one point.

6. The light-source device according to claim 1, wherein the rod integrator has an exit aperture larger than the incident aperture.

7. The light-source device according to claim 1, wherein
  the refractive light guide includes a condenser lens disposed in an optical path between the optical element and the wavelength converter, the condenser lens configured to converge the first colored light reflected by the surface and substantially collimate the second colored light emitted from the wavelength converter, and
  a position of the point S is a point of intersection of an incident plane of the wavelength converter, that the first colored light converged by the condenser lens has been incident on and a straight line connecting the point P and a center of a projection image on an incident plane of the condenser lens that the first colored light reflected by the surface has been incident on, the projection image being formed by the first colored light.

8. An image projection apparatus, comprising:
the light-source device according to claim 1;
an image display configured to generate an image of light emitted from the light-source device;
an illumination optical system configured to guide the light emitted from the light-source device to the image display; and
a projection optical system configured to project the image generated by the image display.

9. The light-source device according to claim 1, wherein the second region includes a first end and a second end,
the first end is further from the first region than the second end is from the first region, and
the first end is outside an optical path of the second colored light.

10. The light-source device according to claim 9, wherein the second end is outside of the optical path of the second colored light.

11. The light-source device according to claim 1, wherein
$\theta_1$ is <than $\theta_2$, where
$\theta_1$ is a maximum incident angle of light rays of the first colored light with respect to the incident aperture of the rod integrator, and
$\theta_2$ is a maximum incident angle of light rays of the second colored light with respect to the incident aperture of the rod integrator.

12. The light-source device according to claim 11, wherein
the rod integrator is composed of glass,
$\theta_{glass}$ is a total reflection condition of the rod integrator, and
$\theta_{glass}$ is greater than each of $\theta_1$ and $\theta_2$.

13. The light-source device according to claim 1, wherein the excitation light source includes a plurality of laser diodes arranged in an array, and
a projection range of the first colored light emitted from the laser diodes, on the incident aperture of the rod integrator, has an elliptical shape having a major axis substantially parallel to either a long side or a short side of the incident aperture of the rod integrator.

* * * * *